US012581511B2

(12) United States Patent
Khoryaev et al.

(10) Patent No.: US 12,581,511 B2
(45) Date of Patent: Mar. 17, 2026

(54) UE CONFIGURED TO SUPPORT INTER-UE COORDINATION (IUC) FEEDBACK FOR V2X SIDELINK COMMUNICATION WITH PEER UE COLLISION AVOIDANCE

(71) Applicant: Intel Corporation, Santa Clara, CA (US)

(72) Inventors: Alexey Khoryaev, Nizhny Novgorod (RU); Mikhail Shilov, Nizhny Novgorod (RU); Sergey Panteleev, Maynooth (IE); Kilian Peter Anton Roth, Munich (DE); Artyom Lomayev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 18/290,496

(22) PCT Filed: Aug. 2, 2022

(86) PCT No.: PCT/US2022/039169
§ 371 (c)(1),
(2) Date: Nov. 14, 2023

(87) PCT Pub. No.: WO2023/014714
PCT Pub. Date: Feb. 9, 2023

(65) Prior Publication Data
US 2025/0287399 A1      Sep. 11, 2025

Related U.S. Application Data

(60) Provisional application No. 63/230,016, filed on Aug. 5, 2021, provisional application No. 63/230,557, filed on Aug. 6, 2021.

(51) Int. Cl.
*H04W 72/25* (2023.01)
*H04B 17/318* (2015.01)

(52) U.S. Cl.
CPC .......... *H04W 72/25* (2023.01); *H04B 17/328* (2023.05)

(58) Field of Classification Search
None
See application file for complete search history.

(56) References Cited

U.S. PATENT DOCUMENTS

| | | | | |
|---|---|---|---|---|
| 12,047,979 B2* | 7/2024 | Wu | | H04W 72/23 |
| 12,185,341 B2* | 12/2024 | Hwang | | H04W 72/02 |

(Continued)

FOREIGN PATENT DOCUMENTS

| | | |
|---|---|---|
| WO | WO-2020198760 A2 | 10/2020 |
| WO | WO-2023014714 A1 | 2/2023 |

OTHER PUBLICATIONS

"International Application Serial No. PCT/US2022/039169, International Preliminary Report on Patentability mailed Feb. 15, 2024", 6 pgs.

(Continued)

*Primary Examiner* — Brian S Roberts
(74) *Attorney, Agent, or Firm* — Schwegman Lundberg & Woessner, P.A.

(57) ABSTRACT

An apparatus and system for new radio (NR) vehicle-to-everything (V2X) sidelink communications are described. UE procedures for transmission of standalone and non-standalone inter-UE coordination feedback and content, as well as for resource selection with the inter-UE coordination feedback are described. The content and container of the inter-UE coordination feedback are provided, in addition to the ordering of resource selection processes carrying the inter-UE coordination feedback and transmission priority and conditions of the inter-UE coordination feedback. The inter-UE coordination feedback request, initial pre-process- (Continued)

Inter-UE coordination feedback is multiplexed w/ additional information in PSSCH PSSCH carries MAC CE with inter-UE coordination feedback + additional feedback (e.g., MAC CE for CSI feedback) and/or data Non-standalone inter-UE coordination feedback ing of the inter-UE coordination feedback, assisting UE selection, and resource selection are presented.

20 Claims, 22 Drawing Sheets

(56) References Cited

U.S. PATENT DOCUMENTS

2022/0361196 A1* 11/2022 Sarkis ................. H04W 72/569
2023/0026229 A1*  1/2023 Hui ....................... H04L 1/1864

OTHER PUBLICATIONS

"International Application Serial No. PCT/US2022/039169, International Search Report mailed Nov. 22, 2022", 3 pgs.
"International Application Serial No. PCT/US2022/039169, Written Opinion mailed Nov. 22, 2022", 4 pgs.
Fraunhofer HHHI, et al., "Resource Allocation Enhancements for Mode 2", R1-2104561, 3GPP TSG RAN WG1 Meeting #105-e, (May 11, 2021), 17 pgs.
Fraunhofer HHI, et al., "Resource Allocation Enhancements for Mode 2", R1-2102812, 3GPP TSG RAN WG1 #104b-e, (Apr. 6, 2021), 12 pgs.
Intel Corporation, "Inter-UE coordination solutions for sidelink resource allocation mode-2", R1-2103049, 3GPP TSG RAN WG1 #104b-e, (Apr. 7, 2021), 12 pgs.
Nokia, et al., "Inter-UE coordination in mode 2 sidelink resource allocation", R1-2104177, 3GPP TSG RAN WG1 Meeting #105-e, (May 12, 2021), 20 pgs.

* cited by examiner

Inter-UE coordination feedback
is transmitted w/o additional
information in PSSCH PSSCH carries only
MAC CE with inter-
UE coordination
feedback only Standalone inter-UE
coordination feedback Inter-UE coordination feedback
is multiplexed w/ additional
information in PSSCH PSSCH carries MAC CE with
inter-UE coordination
feedback + additional
feedback (e.g., MAC CE for
CSI feedback) and/or data Non-standalone inter-UE
coordination feedback Resource selection processes for transmissions w/ different priorities Process #1 – Priority 5

Process #2 – Priority 0

Process #3 – Priority 3

Ordering for resource selection

Ordered resource selection processes for transmissions w/ different priorities

Process #2 – Priority 0 (Highest priority)

Process #3 – Priority 3

Process #1 – Priority 5

UE CONFIGURED TO SUPPORT INTER-UE COORDINATION (IUC) FEEDBACK FOR V2X SIDELINK COMMUNICATION WITH PEER UE COLLISION AVOIDANCE

PRIORITY CLAIM

This application is a U.S. National Stage Filing under 35 U.S.C. 371 from International Application No. PCT/US2022/039169, filed Aug. 2, 2022 and published in English as WO 2023/014714 on Feb. 9, 2023, which claims the benefit of priority to U.S. Provisional Patent Application Ser. No. 63/230,016, filed Aug. 5, 2021, and U.S. Provisional Patent Application Ser. No. 63/230,557, filed Aug. 6, 2021, each of which is incorporated herein by reference in its entirety.

TECHNICAL FIELD

Embodiments pertain to next generation (NG) wireless communications. In particular, some embodiments relate to new radio (NR) vehicle-to-everything (V2X) sidelink communications.

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities and vehicle communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
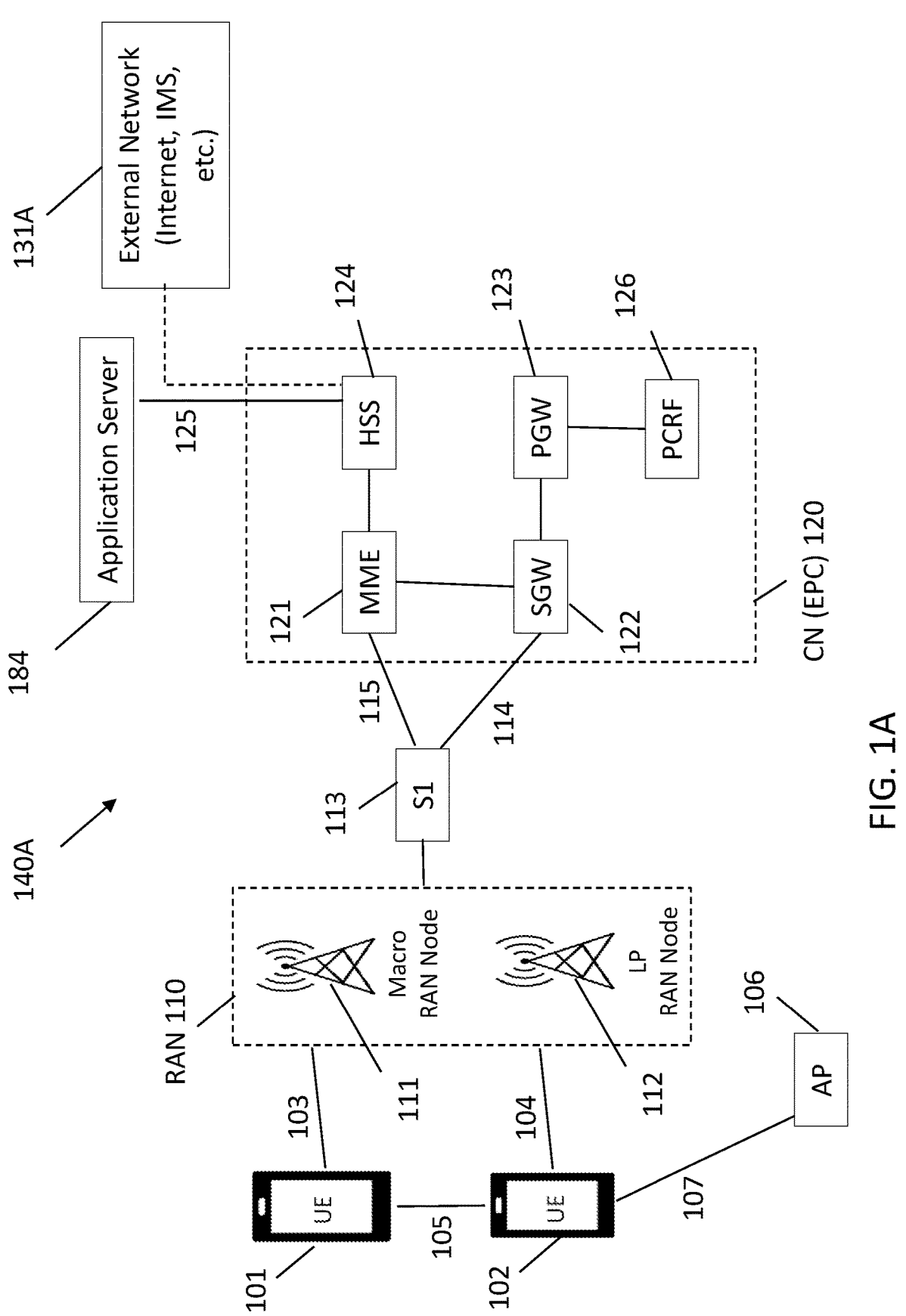
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCREs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
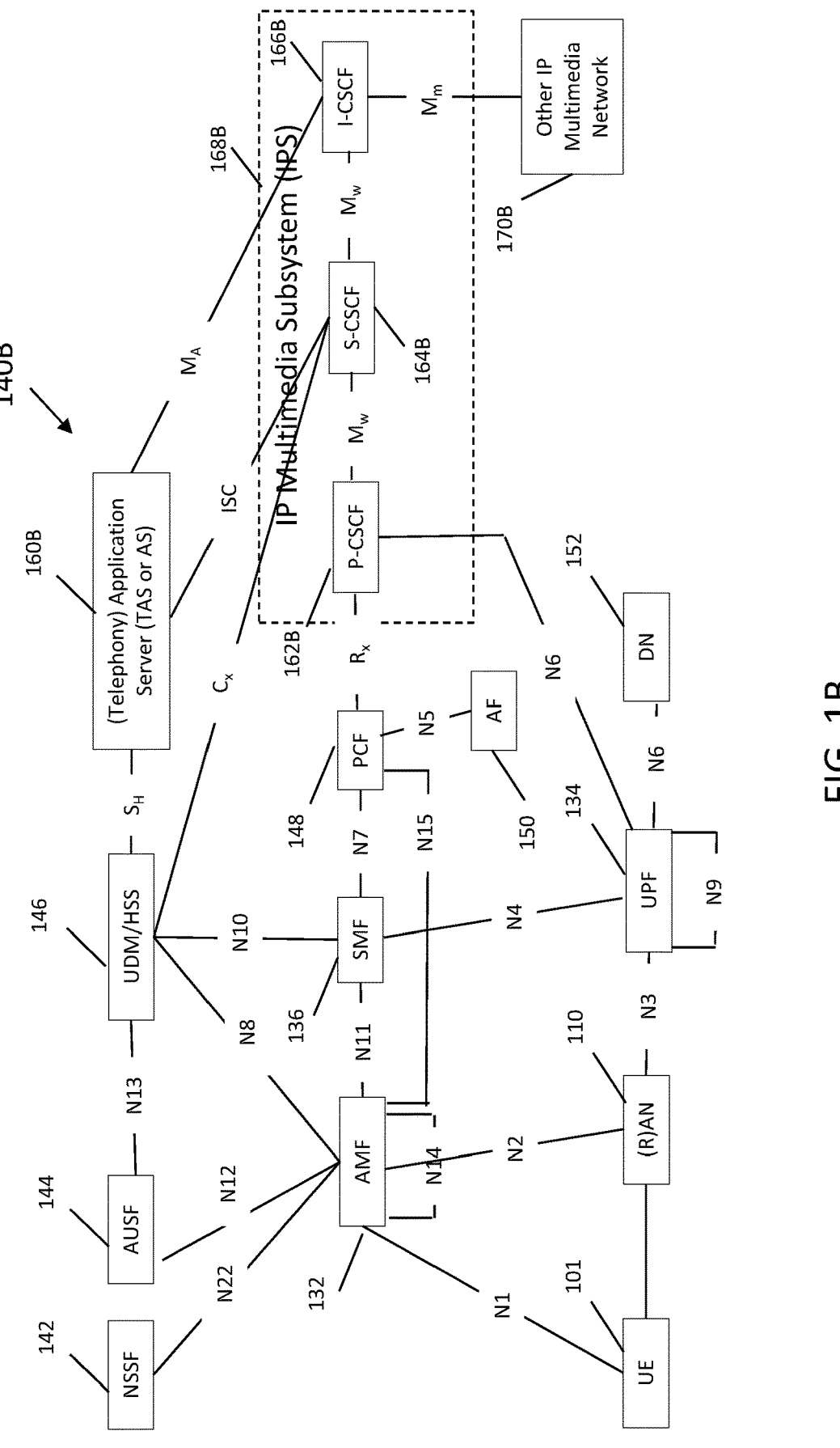
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NPs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
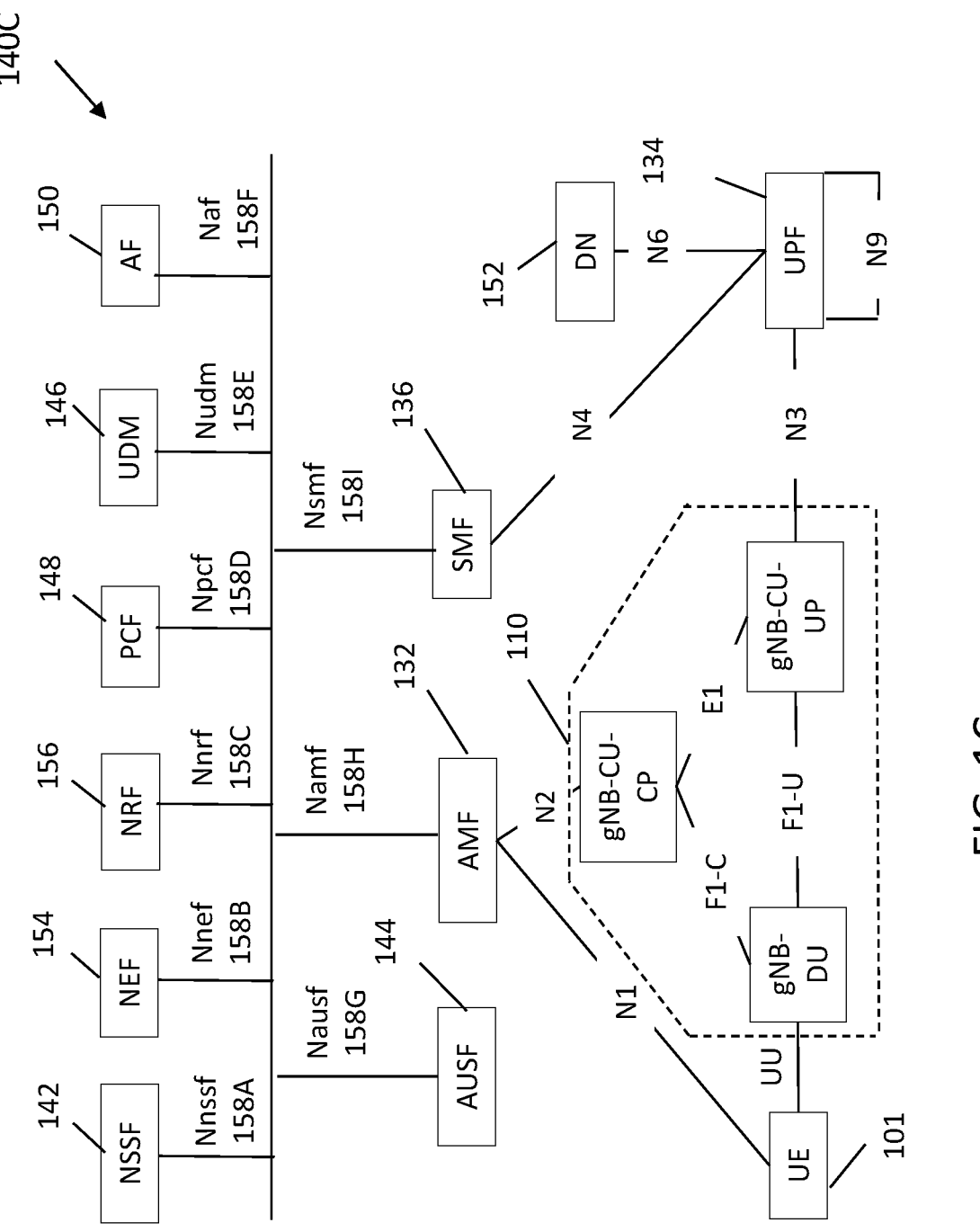
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
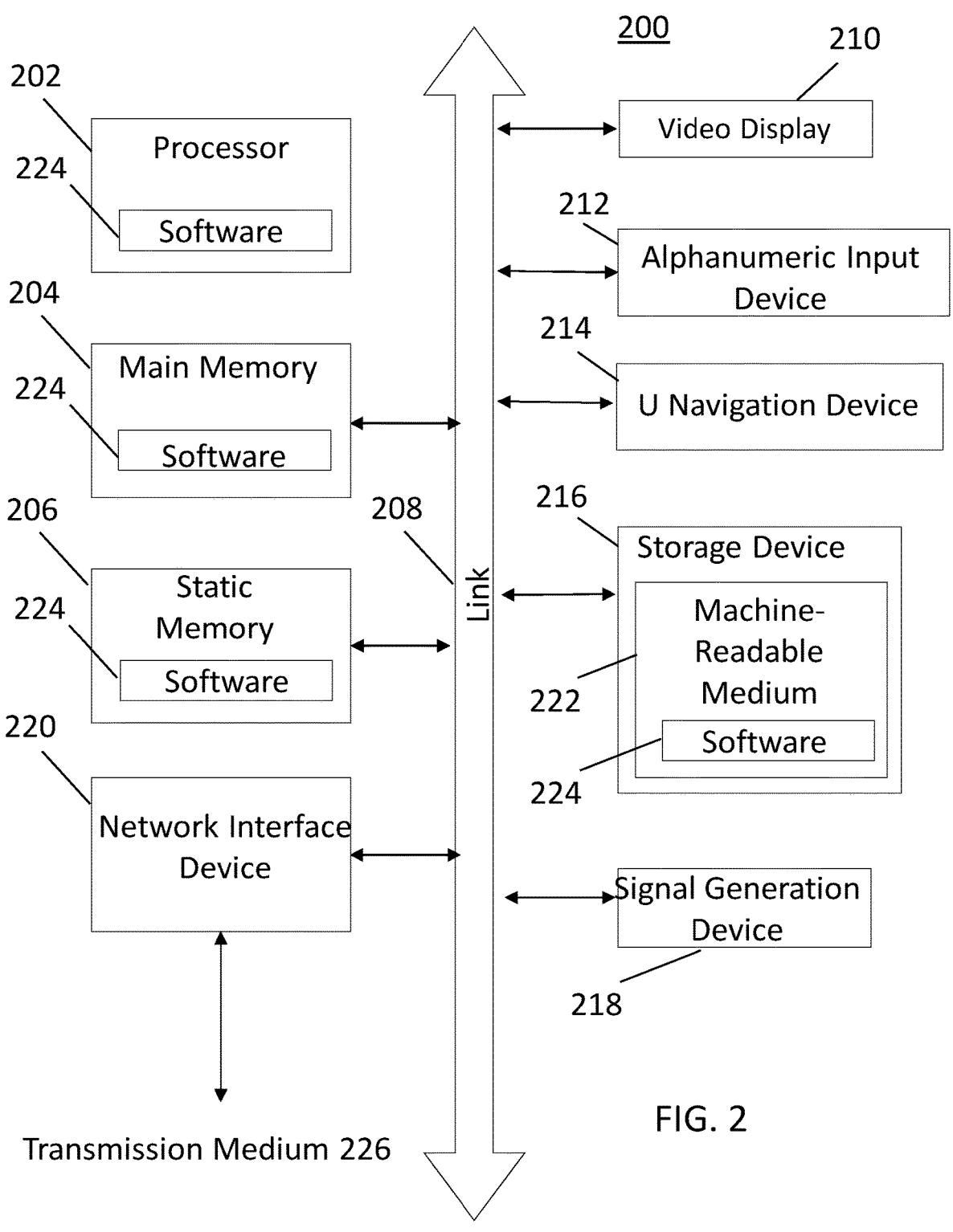
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-IC. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9

(3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (IDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-GSB (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHZ), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/ CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHZ, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHZ (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/Wi-Gig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, NR V2X sidelink communication is a synchronous communication system with distributed resource allocation. UEs autonomously select resources for sidelink transmission based on predefined sensing and resource selection procedures implemented by transmitter (TX) UEs. The sensing and resource selection procedures are designed to reduce potential sidelink conflicts in transmissions or resource reservations (e.g., collisions or half-duplex conflicts). Given that sensing and resource selection procedures are executed only by TX UEs and do not consider environment at the receiver (RX) side there is non-negligible probability of sidelink conflicts (collisions). To address this problem, inter-UE coordination feedback from RX UEs can be used to improve resource allocation decisions by TX UEs and improve overall reliability of NR-V2X sidelink communication.

In some embodiments, two types of transmissions may be used for delivering inter-UE coordination feedback to TX UEs. This may be used to minimize co-channel and half-duplex issues for feedback delivery and keep small overhead from feedback transmission without noticeable impact on overall system loading.

Two high level inter-UE coordination solutions may be used to improve NR V2X sidelink performance: Inter-UE coordination scheme #1 (sidelink conflict/collision avoidance) and Inter-UE coordination scheme #2 (sidelink conflict resolution).

Inter-UE coordination scheme #1 (sidelink conflict/collision avoidance) aims to utilize inter-UE coordination feedback to avoid half-duplex and collisions problems for NR V2X communication. In this case, a UE providing inter-UE coordination feedback reports preferred and/or non-preferred sets of resources to surrounding sidelink transmitters. Sidelink transmitters then apply TX-based sensing procedures and use received inter-UE coordination feedback to select/reserve sidelink resources for transmission and avoid potential sidelink communication conflicts.

Inter-UE coordination scheme #2 (sidelink conflict resolution) aims to utilize inter-UE coordination feedback to resolve sidelink conflicts that either already occurred or potential future conflicts that were detected based on resource reservation signaling. This is used to inform sidelink transmitters about detected sidelink conflicts through inter-UE coordination feedback, so that TX UEs can either perform additional retransmission, or drop planned transmission and reselect a resource for transmission or continue transmission on a reserved resource.

Support of inter-UE coordination scheme #1 may include a number of aspects, including: UE procedures/methods for generation of inter-UE coordination feedback, UE procedures/methods to determine inter-UE coordination feedback cast type and target UEs, UE procedures/methods for transmission of inter-UE coordination feedback and its content, inter-UE coordination feedback reference time and aging information, reference parameters for generation of inter-UE coordination feedback, UE procedures/methods for resource selection with inter-UE coordination feedback, and inter-UE coordination signaling details.

UE Behavior for Transmission of Inter-UE Coordination Feedback and its Content

Standalone/Non-Standalone Inter-UE Coordination Feedback and Content

One of the open questions is whether assisting UE (UE-A) can send standalone inter-UE coordination feedback or only non-standalone inter-UE coordination feedback (i.e., a sidelink transmission with an inter-UE coordination payload only—without other data/control signaling). In general, transmission of standalone inter-UE coordination feedback may create additional interference and half-duplex issues from a system perspective. However, such transmission may be the only option, if feedback is requested by the TX UE and the assisting UE does not have data for transmission. In a more general scenario, the assisting UE may transmit feedback together with other parallel data/traffic to the TX UE.

Accordingly, two options for inter-UE coordination feedback transmissions can be considered: Standalone inter-UE coordination feedback and Non-standalone inter-UE coordination feedback.

Option 1: Standalone Inter-UE Coordination Feedback

In this case, the feedback is transmitted even if the assisting UE does not have other additional data for sidelink transmission/communication. The standalone inter-UE coordination feedback may be supported and generated upon request from the TX UE, and may be applicable to unicast and groupcast communication (e.g., if the assisting UE is requested by the TX UE to provide inter-UE coordination feedback but does not have its own data for transmission towards the target TX UE). The support of standalone transmission may not have a significant impact on the sidelink physical structure introduced in R16/R17. The request for feedback may be carried over sidelink control information (SCI) Format X (as for example Hybrid Automatic Repeat ReQuest (HARQ)/Channel State Information (CSI) feedback request) or using MAC control element (MAC-CE)/RRC signaling carried as a physical sidelink shared channel (PSSCH) payload.

Figure 3A:
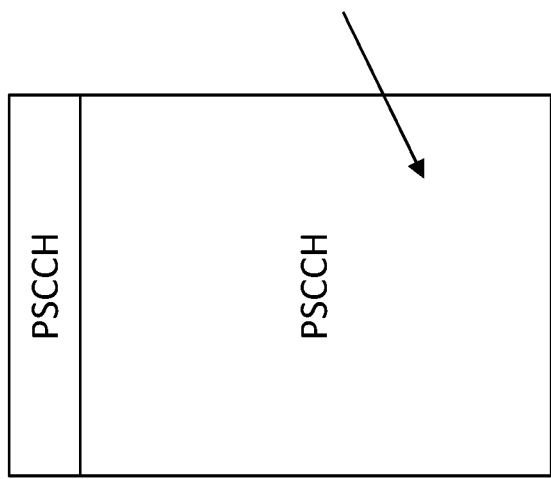
FIG. 3A illustrates standalone inter-UE coordination feedback in accordance with some embodiments.

For example, standalone feedback may be used to deliver assistance information to the TX UE performing unicast or groupcast semi-persistent transmission. The TX UE may request inter-UE coordination feedback for a specific time interval in the future (e.g., resource selection window) and provide parameters to the assisting UEs so that feedback is generated and received immediately before the next resource reselection for the semi-persistent process. FIG. 3A illustrates standalone inter-UE coordination feedback in accordance with some embodiments.

Option 2: Non-Standalone Inter-UE Coordination Feedback

Figure 3B:
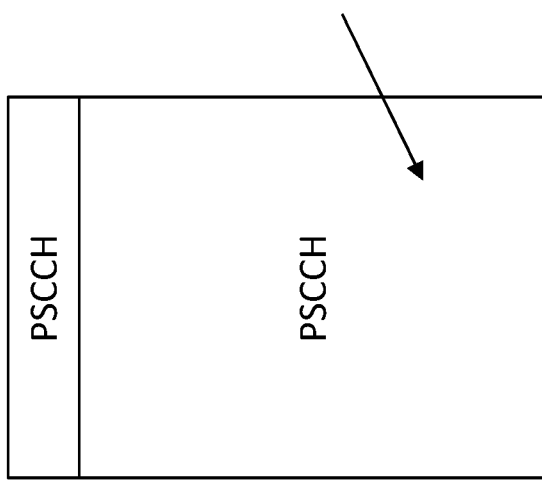
FIG. 3B illustrates non-standalone inter-UE coordination feedback in accordance with some embodiments.

In this case, inter-UE coordination feedback is transmitted when the assisting UE has other/additional data for sidelink transmission/communication. Transmission of non-standalone inter-UE coordination feedback does not have any impact on physical structure. The feedback can be carried over a MAC CE multiplexed with other data and transmitted over the PSSCH. FIG. 3B illustrates non-standalone inter-UE coordination feedback in accordance with some embodiments.

From system perspective, the non-standalone inter-UE coordination feedback may be a viable option since it does not intentionally increase sidelink half-duplex and co-channel collision problems. At the same time, if inter-UE coordination feedback is requested by the TX UE over a unicast connection, then the inter-UE coordination feedback can be also provided in a standalone manner (e.g., using MAC CE signaling). It is also possible that the assisting UE is requested to provide unicast feedback but only has broadcast/groupcast or unicast information for another UE (i.e., not intended for transmission to the TX UE). In this case, the assisting UE may use a broadcast transmission to provide the inter-UE coordination feedback multiplexed with the broadcast/groupcast or unicast information for the other UE.

The content of the inter-UE coordination feedback may depend on the type of communication (referred to as cast type) used for the feedback transmission and whether the inter-UE coordination feedback is a standalone or non-standalone sidelink transmission.

Content and Container for Inter-UE Coordination Feedback

The following containers can be considered to carry inter-UE coordination feedback for sidelink conflict avoidance: SCI Format 2 (Stage 2), MAC CE, PC5 RRC signaling.

The MAC CE may be desirable to use as since the MAC CE may provide flexibility in payload size as well as reasonable latency and can multiplex multiple inter-UE coordination feedback transmissions in a single transmission together with other sidelink data.

The following table gives an overview of potential information fields that can be provided as a part of inter-UE coordination feedback in scheme 1:

TABLE 1

| Field name | Potential values |
|---|---|
| Header information | Required to determine the size of the information and distinguish from other information types (e.g. in case of MAC CE) |
| Assistance information type | Indication of preferred (set-1)/non-preferred (set-2) resource set(s) or both resource sets |
| Preferred resource set (Set-1) | Indication of preferred resource set (preferred sidelink resources) Each resource set can be further divided into two sub-sets: dynamic and semi-persistent resource sub-sets to distinguish resource reserved by dynamic or semi-persistent sidelink transmissions For each resource, UE can additionally report transmission/reservation period of the detected |

TABLE 1-continued

| Field name | Potential values |
| --- | --- |
| | sidelink transmission on this resource or zero for dynamic transmission<br>Resource set can be provided per each resource reservation period applied by assisting UE or per set of resource reservation periods applied by assisting UE.<br>Multiple resource sub-sets can be provided associated with different resource reservation periods including zero reservation period. |
| Non-preferred resource set (Set-2) | Indication of non-preferred resources in non-preferred resource set<br>Each resource set can be further divided into two sub-sets: dynamic and semi-persistent resource sub-sets to distinguish resource reserved by dynamic or semi-persistent sidelink transmissions<br>The set of non-preferred resources Set-2 may also be divided into two resource subsets<br>Resource set Set-2$_{1-NP}$: Resources determined by assisting UE based on radio-sensing and resource exclusion/selection procedure (it can be constructed following R16 sensing and resource exclusion procedure)<br>Resource set Set-2$_{2-NP}$: Resources selected or reserved by assisting UE for potential sidelink or uplink transmissions that affect UE sidelink reception capabilities<br>For each resource, UE can additionally report transmission/reservation period of the detected sidelink transmission on this resource or zero for dynamic transmission<br>Resource set can be provided per each resource reservation period applied by assisting UE or per set of resource reservation periods applied by assisting UE.<br>Multiple resource sets can be provided associated with different resource reservation periods including zero reservation period. |
| Reference resource size | Number of subchannels used as a reference resource for construction of preferred/non-preferred resource set(s)<br>Number of slots used as a reference resource for construction of preferred/non-preferred resource set(s)<br>Different values can be provided for preferred and non-preferred resource set(s)<br>Multiple resource sets can be reported associated with different reference resource sizes. |
| Size of resource set(s) | Number of resources in resource set<br>Different values can be provided for preferred and non-preferred resource set(s). |
| SL-RSRP/SINR/CQI/range thresholds for set-1 and set-2 | Threshold types and values used to generate resource set(s) (set-1/set-2) if it is not pre-configured (i.e., adapted for generation of resource sets)<br>Different values can be provided for preferred and non-preferred resource sets |
| SL-RSRP/SINR/CQI/range values for set-1 and set-2 | Measured values per reported resources<br>Different sets of values can be provided for preferred and non-preferred resource sets |
| Reference priority(ies) | Reference priority values used to generate preferred/non-preferred resource sets if it is not pre-configured<br>Different values can be provided for preferred and non-preferred resource sets<br>UE can generate resource sets per priority value(s) |
| Start slot index(es) of resource selection window(s) or reported resource set(s) | Indicates start slot index(es) associated with the resource selection window(s) used for generation of resource set(s) i.e., timestamp(s) of resource set generation) |
| Start & End of sensing window | First & last sidelink slot sensed for given inter-UE coordination feedback (or first slot + slot offset/duration) |
| Sensing mode/parameters | Indication of full/partial sensing mode and sensing parameters |
| Sidelink TX and/or RX resource pool ID | Indicates sidelink resource pool associated with inter-UE coordination feedback |
| Dynamic transmissions | Indicates whether dynamic transmissions were |

TABLE 1-continued

| Field name | Potential values |
| --- | --- |
| considered for feedback | considered for preparation of preferred/non-preferred resource sets |
| Semi-persistent transmissions considered for feedback | Indicates whether semi-persistent transmissions were considered for preparation of preferred/non-preferred resource set(s) and which reservation periods were considered in sensing/resource selection procedures |
| Set of resource reservation periods | Indicates set of resource reservation periods applied for generation of inter-UE coordination feedback (resource sets) |
| Source/Destination IDs | Indicates Source/Destination IDs (cast types) for generation of inter-UE coordination feedback (resource sets) |

Ordering of Resource Selection Processes Carrying Inter-UE Coordination Feedback If a UE has multiple sidelink sessions of different cast types, the scheduling among cast types can be left up to UE implementation. The order of resource selection may be performed according to priority of the sidelink transmission including associated inter-UE coordination feedback. In the case of equal priority transmissions, the following resource selection ordering rules can be applied:

Example 1: Transmissions with inter-UE coordination feedback>Transmissions without inter-UE coordination feedback (i.e., resource selection is done/prioritized for transmissions with inter-UE coordination feedback first)

Figure 4A:
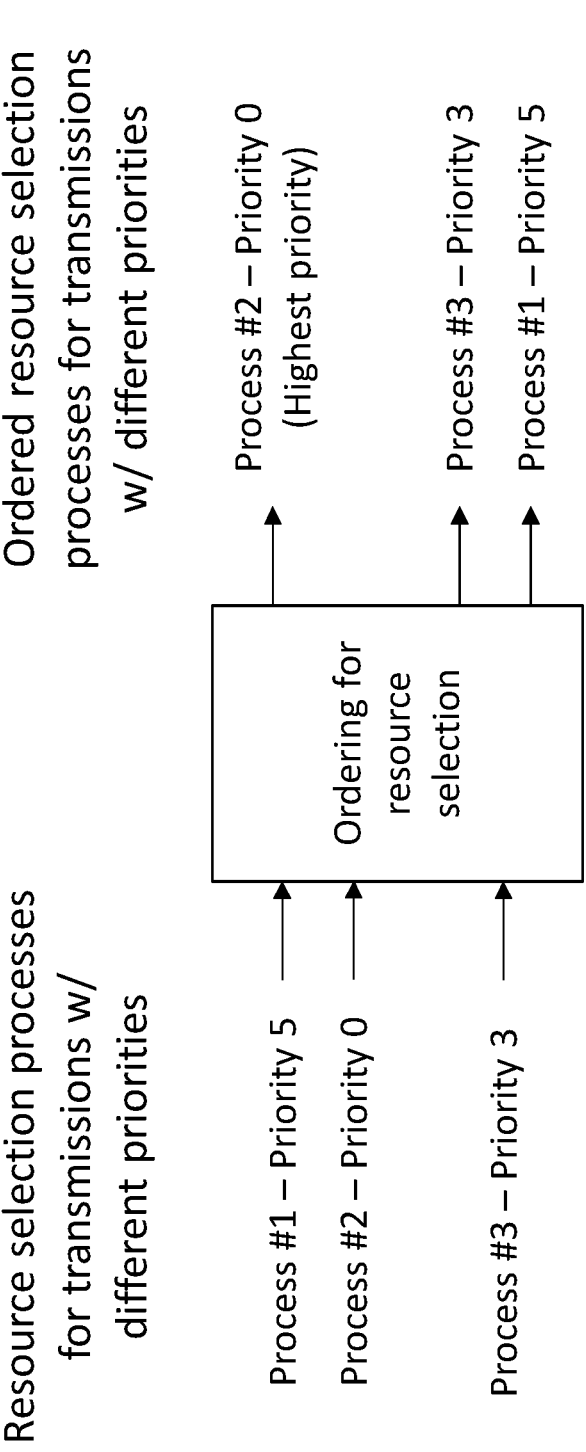
FIG. 4A illustrates ordering of resource selection processes based on priority in accordance with some embodiments.
Figure 4B:
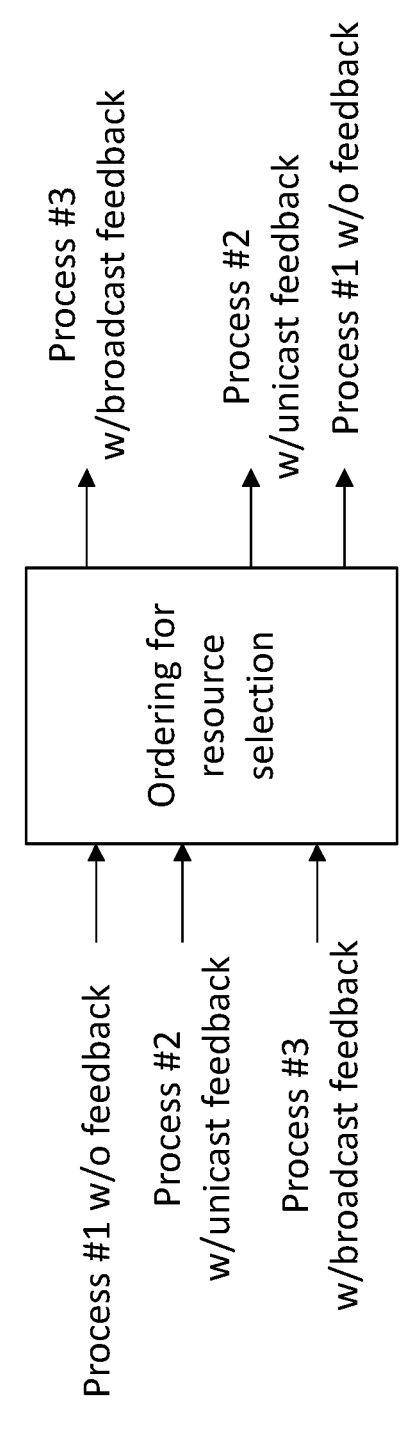
FIG. 4B illustrates ordering of resource selection processes based on feedback type in accordance with some embodiments, resource size alignment procedure

Example 2: Unicast with inter-UE coordination feedback>Groupcast with inter-UE coordination feedback>Broadcast with inter-UE coordination feedback>Transmissions without inter-UE coordination feedback Example 3: Broadcast with inter-UE coordination feedback>Groupcast with inter-UE coordination feedback>Unicast with inter-UE coordination feedback>Transmissions without inter-UE coordination feedback FIG. 4A illustrates ordering of resource selection processes based on priority in accordance with some embodiments. FIG. 4B illustrates ordering of resource selection processes based on feedback type in accordance with some embodiments. As shown in FIG. 4B, broadcast feedback has a higher priority than groupcast feedback, which has a higher priority than unicast feedback, which has a higher priority than transmissions without feedback.

Pre-selected/pre-reserved resources may be excluded from resource selection for subsequent selection processes running in parallel (i.e., simultaneously) at the UE selecting resources.

Priority of Inter-UE Coordination Feedback Transmission

For inter-UE coordination scheme 1 (sidelink conflict avoidance), the assisting UE transmits inter-UE coordination feedback as well as transmits or receives user/control plane data. If multiplexing of both transmissions is not possible then the UE may decide what to transmit first. To address such situations, the inter-UE coordination feedback can be associated with sidelink transmission priority that can be used to decide which transmission to pursue first, i.e., with higher priority. In general, the following options are possible:

Option 1: Regular sidelink (user/control plane) transmissions are prioritized over inter-UE coordination feedback transmission/reception (can be pre-defined or subject to pre-configuration signaling).

Option 2: Inter-UE coordination feedback transmission/reception is prioritized over regular sidelink transmission/reception (can be pre-defined or subject to pre-configuration signaling).

Option 3: Inter-UE coordination feedback is associated with sidelink transmission priority. The sidelink transmission priority levels of the inter-UE coordination feedback and regular sidelink transmission are used to determine whether transmission/reception of the inter-UE coordination feedback is prioritized over the regular sidelink transmission.

Option 4: Inter-UE coordination feedback is multiplexed with the regular sidelink transmission and the highest priority level among two is associated with the multiplexed sidelink transmission.

Priority for inter-UE coordination feedback can take several different modes:

Pre-configured: in which the priority levels for inter-UE coordination feedback can be pre-configured by a gNB/network using RRC signaling or application layer (e.g., for broadcast inter-UE coordination feedback).

Different cast types (broadcast/groupcast/unicast) for inter-UE coordination feedback may be associated with different priority levels.

Determined by the assisting UE.

Derived from the priority level of sidelink transmissions of the assisting UE.

Derived from the priority of transmissions of the target TX UE.

Determined by the assisting UE based on the priority level of sidelink transmissions of the target TX UE requesting inter-UE coordination feedback (e.g., for unicast/groupcast inter-UE coordination feedback).

Conditions for Transmission of Inter-UE Coordination Feedback

The following set of conditions can be used to enable generation and trigger transmission of the inter-UE coordination feedback:

Condition 1: Inter-UE coordination feedback is enabled per sidelink resource pool. In addition, the following configuration for specific inter-UE coordination feedback type can be provided: the configuration of enabled in resource pool standalone or non-standalone inter-UE coordination feedback if not predefined; the configuration of enabled in resource pool inter-UE coordination feedback based on semi-persistent only/dynamic only or both semi-persistent and dynamic resource allocation if not predefined; and the configuration of enabled inter-UE coordination feedback cast types/ destinations or format if not predefined.

Condition 2: the UE received a request to provide inter-UE coordination feedback of a certain type from other UEs (e.g., UE group member).

Condition 3: the UE is configured to provide inter-UE coordination feedback by higher layers and has available data for sidelink transmission (non-standalone inter-UE coordination feedback).

Condition 4: the higher layers have triggered transmission of inter-UE coordination feedback based on a timer condition. This condition may be that a pre-configured amount of time has passed since the previous trigger for transmission of inter-UE coordination feedback.

Condition 5: the higher layers have triggered inter-UE coordination feedback based on a travelled distance condition. This condition may be that a pre-configured distance has been travelled since the previous trigger/ transmission of inter-UE coordination feedback.

Condition 6: the UE is provided with configuration settings to generate inter-UE coordination feedback, e.g., a reference configuration for inter-UE coordination feedback (i.e., sensing based preferred/non-preferred resource sets for a sidelink resource selection procedure). Alternatively, the UE can use default settings.

Condition 7: Sidelink transmission of the inter-UE coordination feedback was configured and activated, e.g., by higher layer signaling or by the UE and/or gNB.

Condition 8: The status of the congestion control is showing that the channel is not severely overloaded. In this case, the inter-UE coordination feedback is generated based on constant bit rate (CBR) settings (i.e., if CBR measurements are within a pre-configured ranges).

Condition 9: the UE has selected or reserved sidelink resources for its own potential sidelink transmissions and wants to update other UEs to avoid potential sidelink conflicts.

Condition 10: the UE generates the inter-UE coordination feedback 1) if sidelink Reference Signal Received Power (SL-RSRP) thresholds used to construct resource sets (preferred/non-preferred) are above/below pre-configured values of SL-RSPR thresholds that are configured to trigger the inter-UE coordination feedback and/or 2) the set size is within a preconfigured range [X1, X2] that may be defined relative to number of resources in selection time interval.

The set of conditions described above can be applied in any possible combination to determine when the UE can generate inter-UE coordination feedback.

UE Procedures/Methods for Resource Selection with Inter-UE Coordination Feedback Each TX UE may receive inter-UE coordination feedback from one or more UEs. Additionally, feedback may arrive at different time instances and may include assistance information having different delay/aging time and/or generated for different reference configuration settings used for feedback generation parameters. To optimize the TX-based resource selection procedure by considering inter-UE coordination feedback, TX UE behavior/procedures on how to process feedback information should be defined.

In general, sidelink communication based on TX UE sensing and inter-UE coordination feedback can include the following operations:

Request of inter-UE coordination feedback

Initial pre-processing of feedback information at TX UE (feedback translation)

Selection of assisting UE(s) and inter-UE coordination reports(s), which includes filtering sources of feedback information and filtering of feedback information Feedback application for TX UE resource selection, which includes feedback aggregation/combining and resource selection based on TX UE sensing and inter-UE coordination feedback.

Depending on implementation, some of the operations or sub-operations may be skipped, combined into the single processing step. Additionally, the order of the operations may be changed.

Request of Inter-UE Coordination Feedback

In case of unicast or groupcast transmission, the TX UE may explicitly request generation of inter-UE coordination feedback by target RX UEs. In this case, the TX UE generates an inter-UE coordination feedback request which may include the following information:

Number of sub-channels L per sidelink preferred/non-preferred resource. The values can also be pre-configured in advance to UEs providing feedback or default settings can be assigned.

Sidelink transmission priority value for resource selection at assisting UE side. The values can also be pre-configured in advance to UEs providing feedback or default settings can be assigned.

Resource selection window parameters for feedback generation (start time+duration or/end time) or bounds for resource selection window determination. This can be configured in subframes/slots/transmission time indexes (TTIs) or can be configured to a TX UE resource selection window.

Sensing window parameters for feedback generation (start time+duration or/end time), which can include a required minimum sensing window.

Size of resource set in % (e.g., minimum size of resource set(s)—5, 10, 20, 30, 40, 50, . . . . N<100% of resources in selection window).

Threshold types and values (e.g., $SL\text{-}RSRP_{preferred}$, $SL\text{-}RSRP_{non\text{-}preferred}$). This can be used to construct preferred and non-preferred resource sets using SCI decoding and sidelink measurements.

Resource reservation period or set of resource reservation periods for feedback generation.

Reference number of potential future collisions considered in the feedback generation. This can be a fixed value, per periodicity or every occasion below a threshold after the end of the window.

Type of feedback report, whether semi-persistent/dynamic transmissions or both used for feedback generation.

The described above values can be also pre-configured in advance to UEs providing feedback or default settings can be assigned. If semi-persistent transmission is performed by the TX UE, the assistance feedback request may be transmitted immediately before the upcoming resource reselection event. This time instance is known to the TX UE so that the feedback provides the up-to-date information.

Initial Pre-Processing of Feedback Information at TX UE (Feedback Translation)

Based on information indicated in the feedback, information pre-processing at the TX UE may be used before feedback selection and further feedback information processing.

The information pre-processing may include:

Feedback Information Translation

If parameters of the TX UE transmission are different from the parameters that were used by the assisting UE to generate the feedback, feedback information may be pre-processed and aligned with parameters used by the TX UE for sensing and resource selection (e.g., resource size for TX is different from the one used for feedback generation). At least the following procedures can be applied by the TX UEs:

1) Resource size alignment (translation of the reference resources in feedback to the TX UE resources)
2) Resource selection window alignment (translation of the reference resources in feedback to resources from the TX UE resource selection window)
3) SL-RSRP measurement alignment (if resources in the feedback are associated with a SL-RSRP measurement, additional filtering of the feedback resources can be done to modify the resource set)

Example of Resource Size Alignment Procedure

Figure 5A:
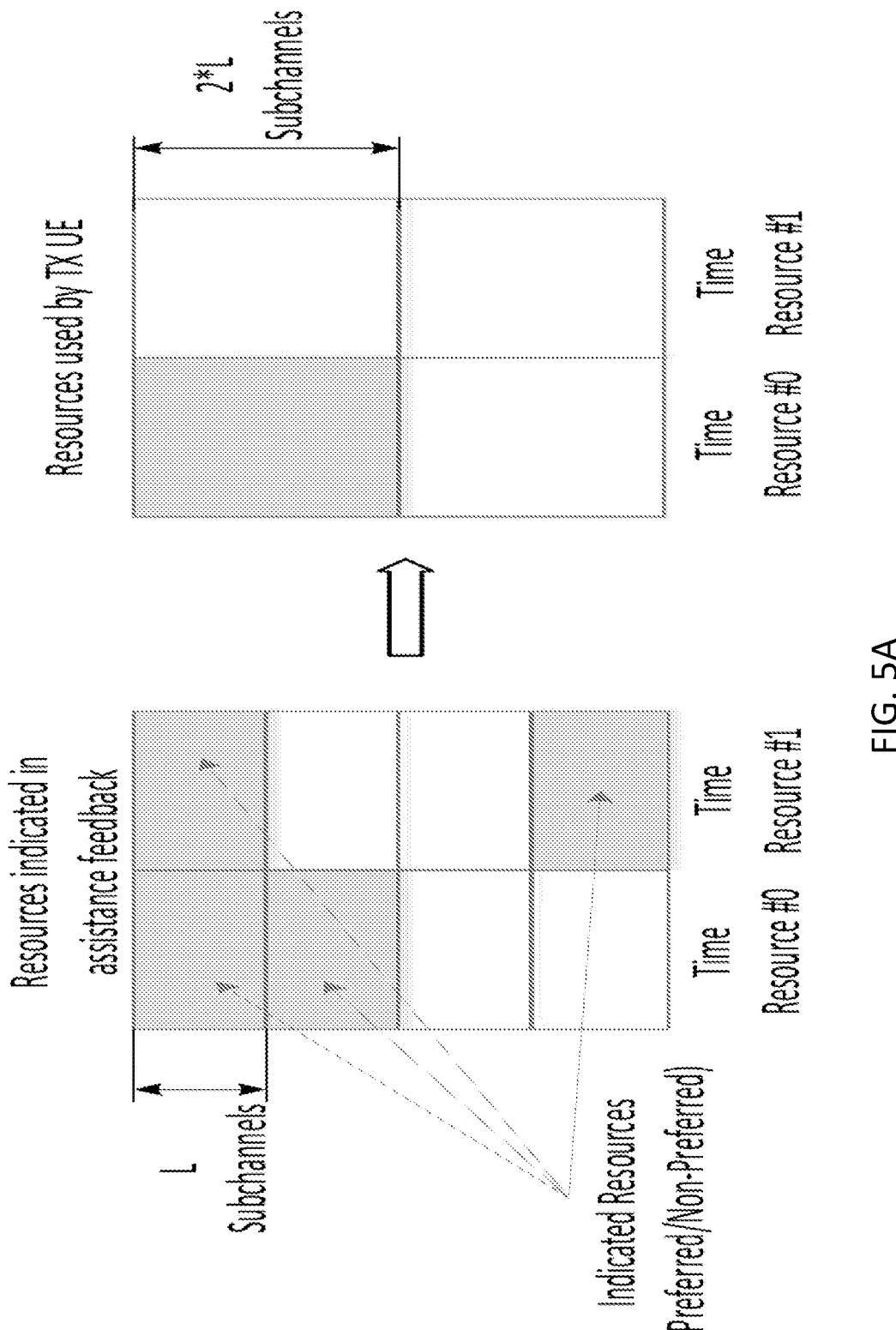
FIG. 5A illustrates a resource size alignment procedure in accordance with some embodiments, resource size alignment procedure.
Figure 5B:
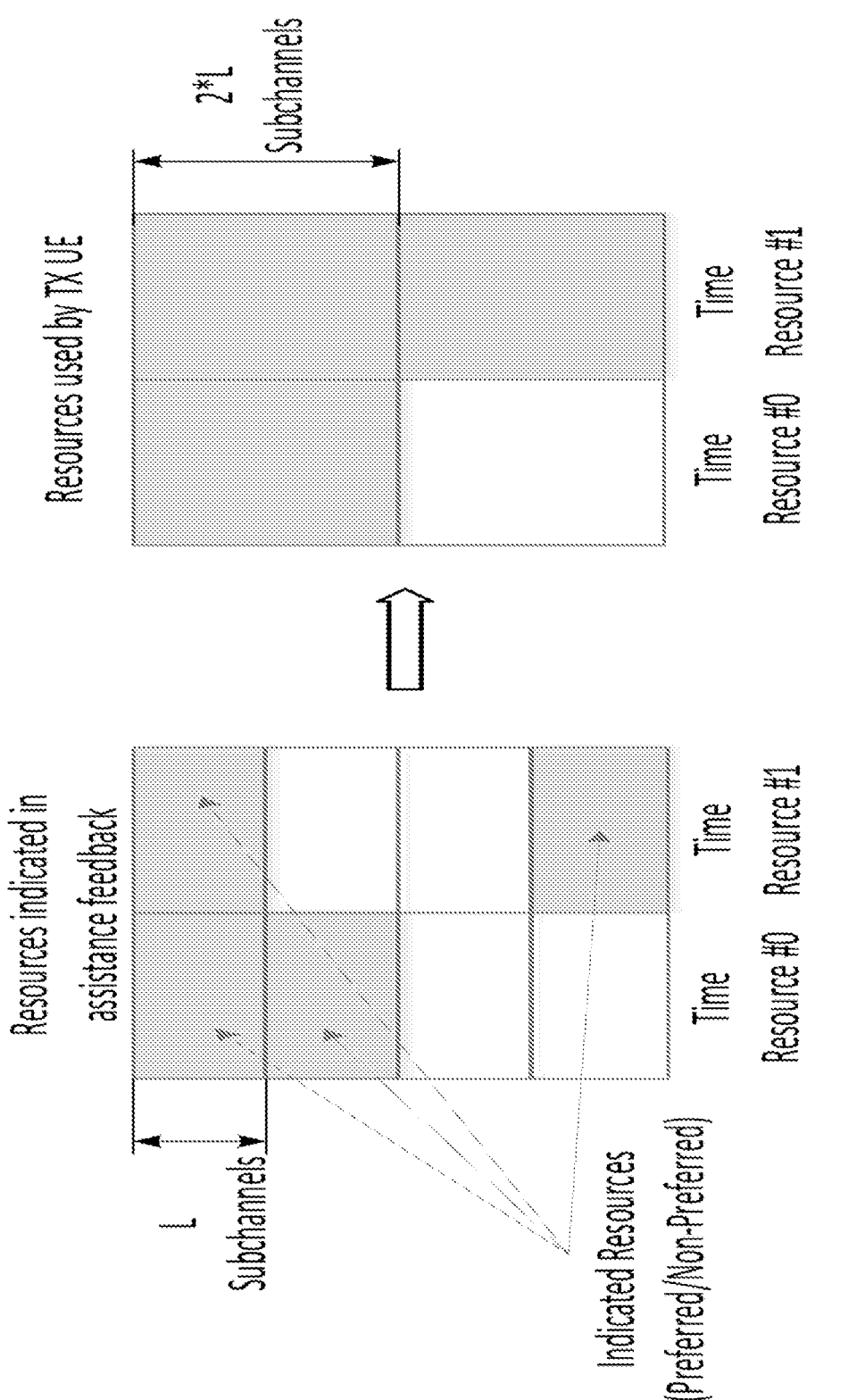
FIG. 5B illustrates another resource size alignment procedure in accordance with some embodiments.

Reference resource size for feedback<Resource size of the TX UE, FIG. 5A illustrates a resource size alignment procedure in accordance with some embodiments, resource size alignment procedure. FIG. 5A illustrates an example in which the reference resource for feedback is composed from L subchannels and resource for transmission of N subchannels, where N=2L. In this case, the TX resource contains two adjacent feedback resources. If two adjacent feedback resources belong to the resource set, then the adjacent feedback resources can be considered as a TX resource for the same set. FIG. 5B illustrates another resource size alignment procedure in accordance with some embodiments. In this case, if one of the two adjacent feedback resources belong to the resource set, then the adjacent feedback resources can be considered as a TX resource for the same set.

Reference resource size for feedback>Resource size of the TX UE. In this case, any combination of N adjacent subchannels out of L subchannels can be used as a TX resource.

Selection of Assisting UE(s) and Inter-UE Coordination Reports(s) by TX UE

Selection of the assisting UE(s) and inter-UE coordination reports(s) can be done in two operations: Selection of UEs with feedback information (filtering sources of feedback information) and filtering of feedback information. Depending on implementation, these operations can be combined into a single operation.

Selection of UEs with Feedback Information

The following set of parameters can be configured to select UEs with feedback information for further processing:

Radio-range (e.g., SL-RSRP range) to the UE providing inter-UE coordination feedback (applicable to sensing based preferred/non-preferred resource sets)

Location information, which may include distance and/or angle range, as well as other location properties (e.g., coordinate, altitude, street location, etc.)

Relative speed/velocity vector with respect to the UE providing inter-UE coordination feedback, which may include travel direction, e.g., relative to the UE providing inter-UE coordination feedback or in absolute terms (North/South/West/East)

Filtering of Feedback Information

The following parameters can be used to select feedback reports:

Feedback source/destination ID and cast type (unicast/groupcast/broadcast)

Feedback type (dynamic/semi-persistent/both)

Feedback delay/aging time

Feedback aging information can be evaluated to decide whether to consider given feedback or prioritize the most recent feedback. Option 1: Feedback aging can be evaluated at the initial resource selection only (once per transmission block (TB) transmission). In this case, the same set of feedback or feedback sources is used to determine assistance information that may further be used in resource selection. Option 2: Feedback aging value is evaluated at each resource (re-)selection/(re-) evaluation time. In this case, at each time moment, assistance information sources may change in time as the most recent information from different set of sources can be selected.

Resource Indication Window

Feedback resource selection window (start/end time). The feedback, which has a resource selection window overlapped with the TX UE resource selection window with at least N time resources or portion of all time resources in the selection window, may be selected for further processing.

Figure 6:
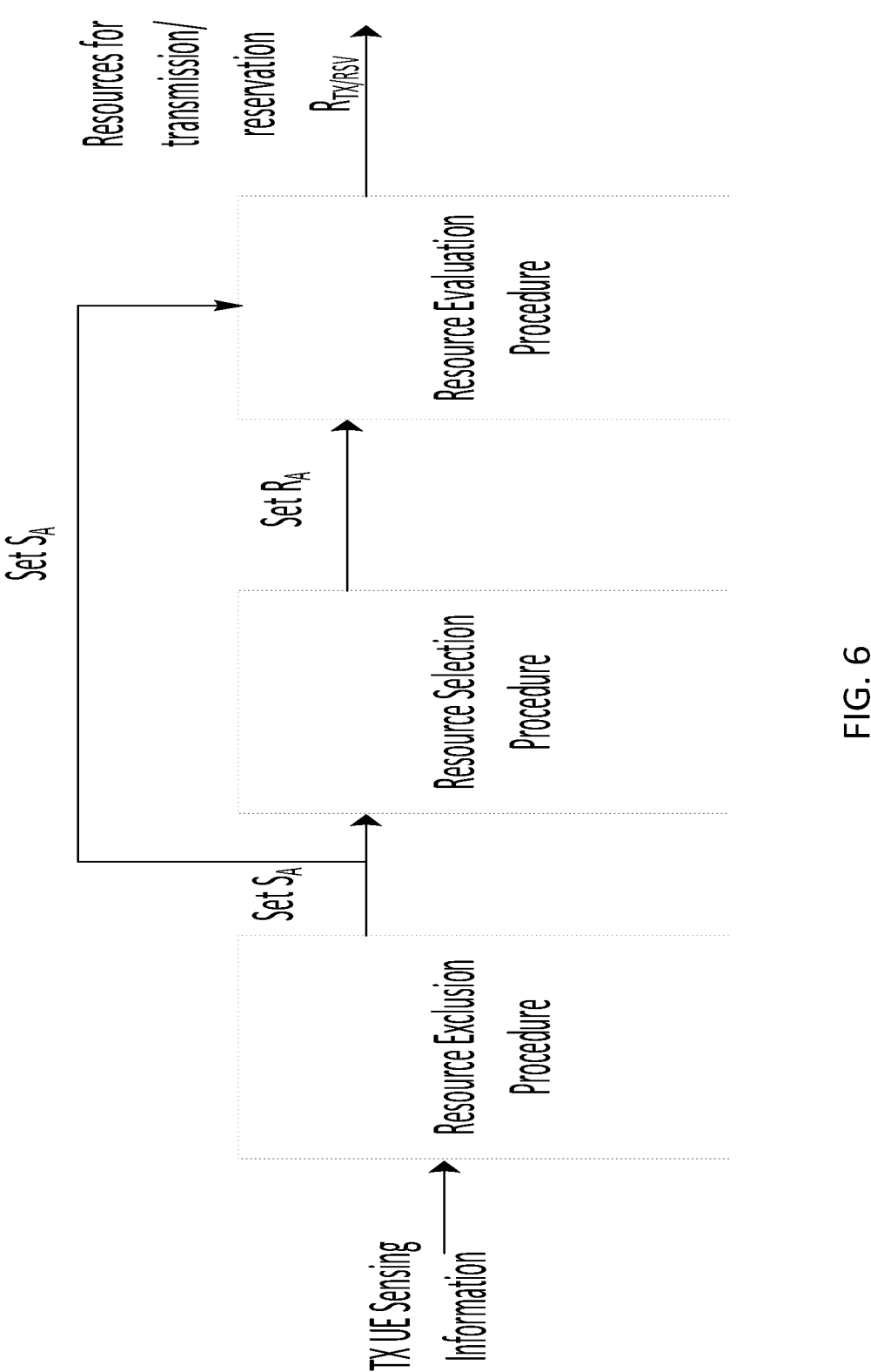
FIG. 6 illustrates a block diagram of a NR V2X sidelink resource allocation procedure in accordance with some embodiments.

Resource reservation period for feedback
Resource size for feedback generation
Reference thresholds (types and values)
Priority value for feedback generation Feedback Application for TX UE Resource Selection Review of R16/R17 Resource Allocation Procedure FIG. 6 illustrates a block diagram of a NR V2X sidelink resource allocation procedure in accordance with some embodiments. In FIG. 6, the sensing data are processed to exclude reserved resources in the resource selection window and form a TX-based candidate resource set for transmission $S_A$. Then, N resources are selected for potential transmission represented by set $R_S$. These resources are re-evaluated by using the most recent sensing information to finally determine resources to be used for transmission and reservation.

Solutions to Consider of R16/R17 Resource Allocation Procedure

Figure 7A:
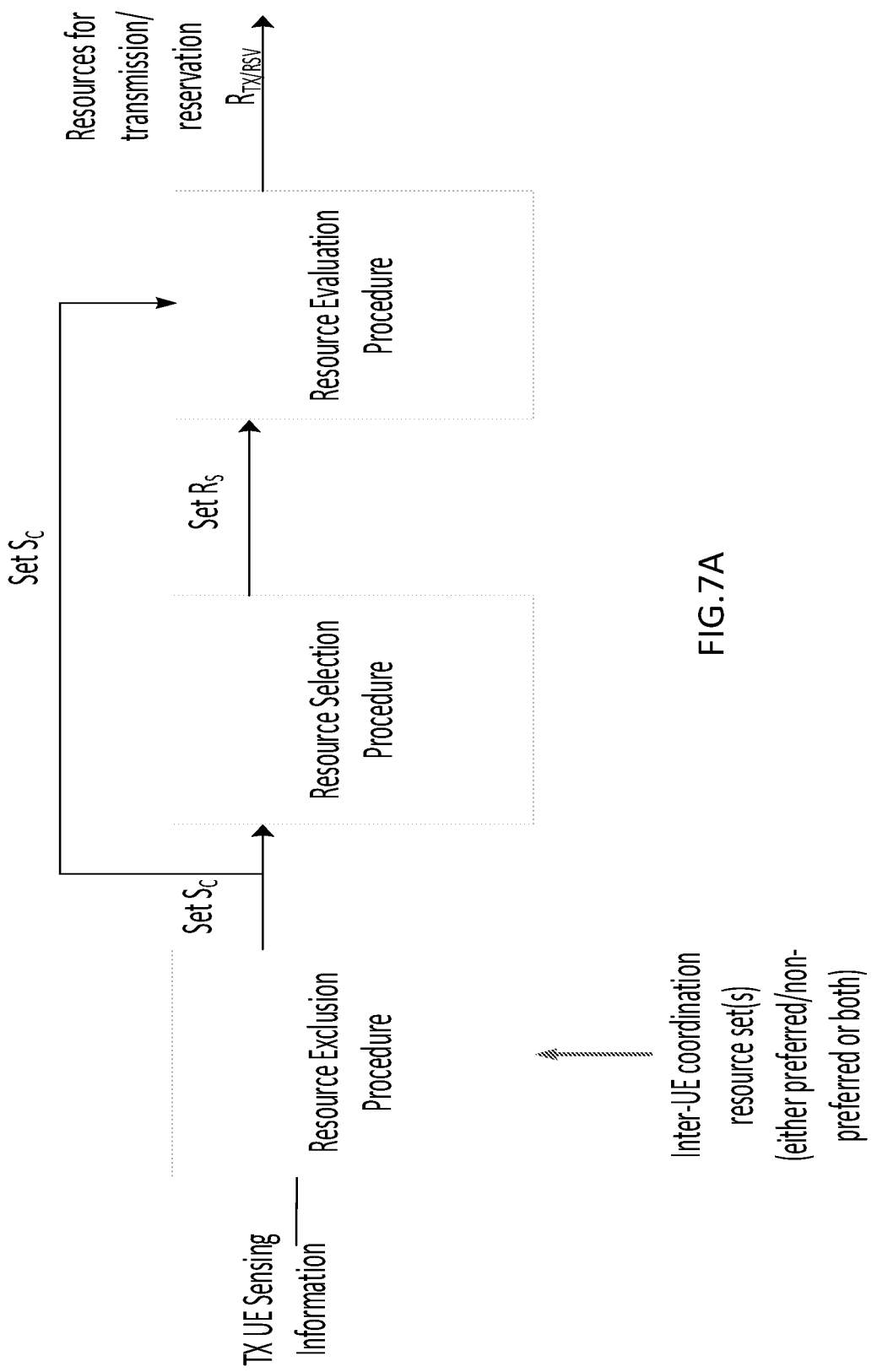
FIG. 7A illustrates a block diagram of a first option of a NR V2X sidelink resource allocation procedure with inter-UE coordination feedback in accordance with some embodiments.
Figure 7B:
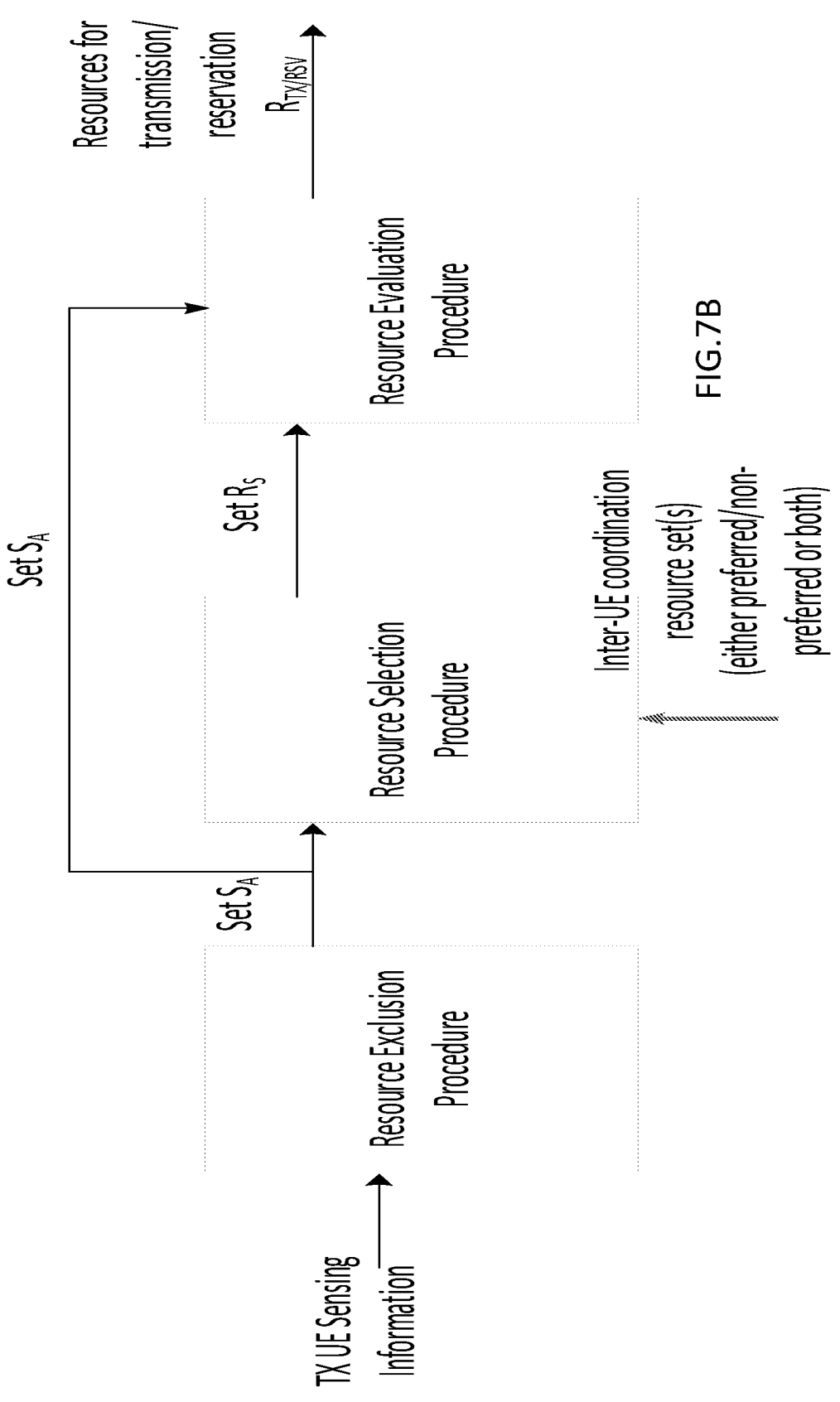
FIG. 7B illustrates a block diagram of a second option of a NR V2X sidelink resource allocation procedure with inter-UE coordination feedback in accordance with some embodiments.
Figure 7C:
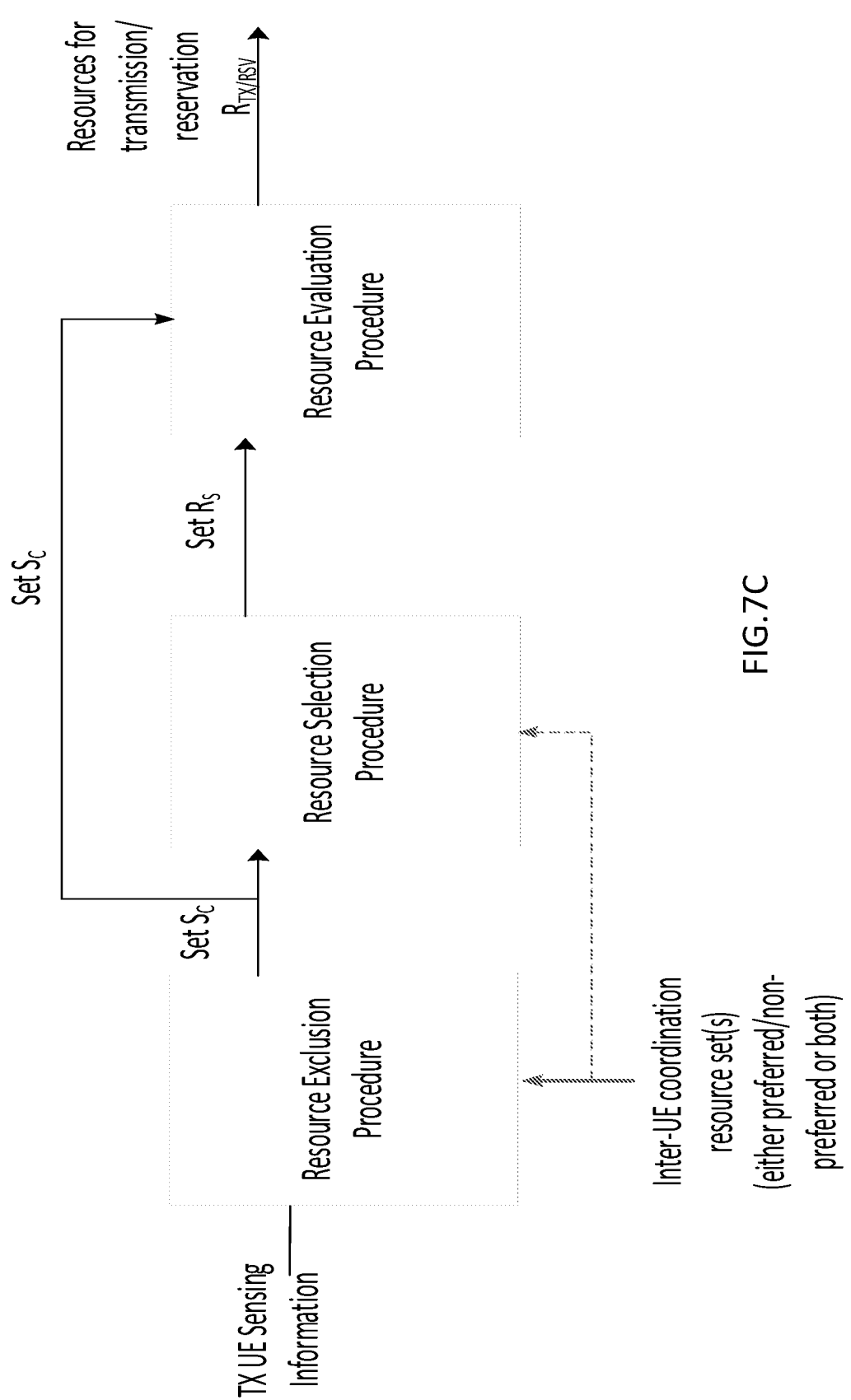
FIG. 7C illustrates a block diagram of a third option of a NR V2X sidelink resource allocation procedure with inter-UE coordination feedback in accordance with some embodiments.
Figure 7D:
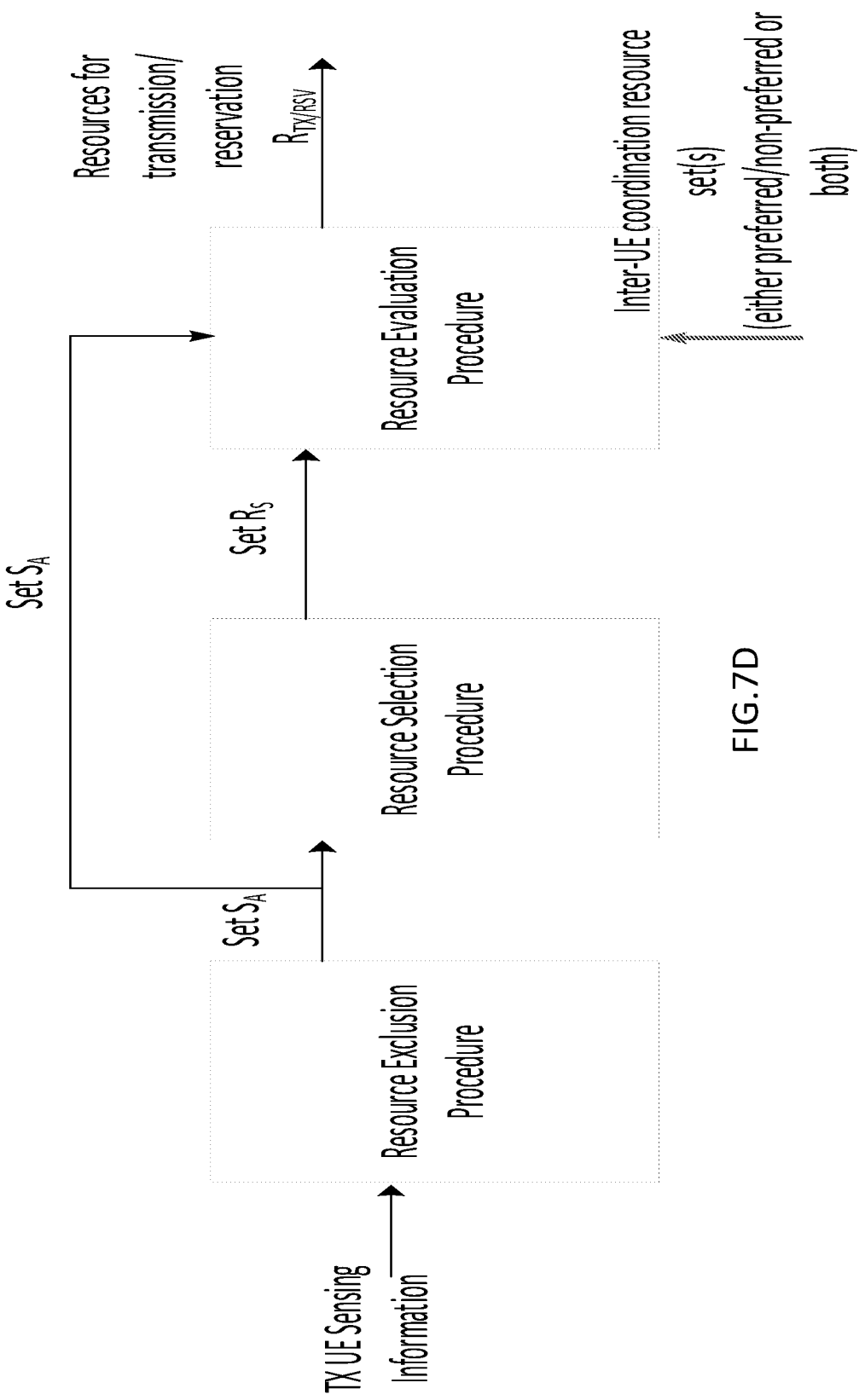
FIG. 7D illustrates a block diagram of a fourth option of a NR V2X sidelink resource allocation procedure with inter-UE coordination feedback in accordance with some embodiments.
Figure 7E:
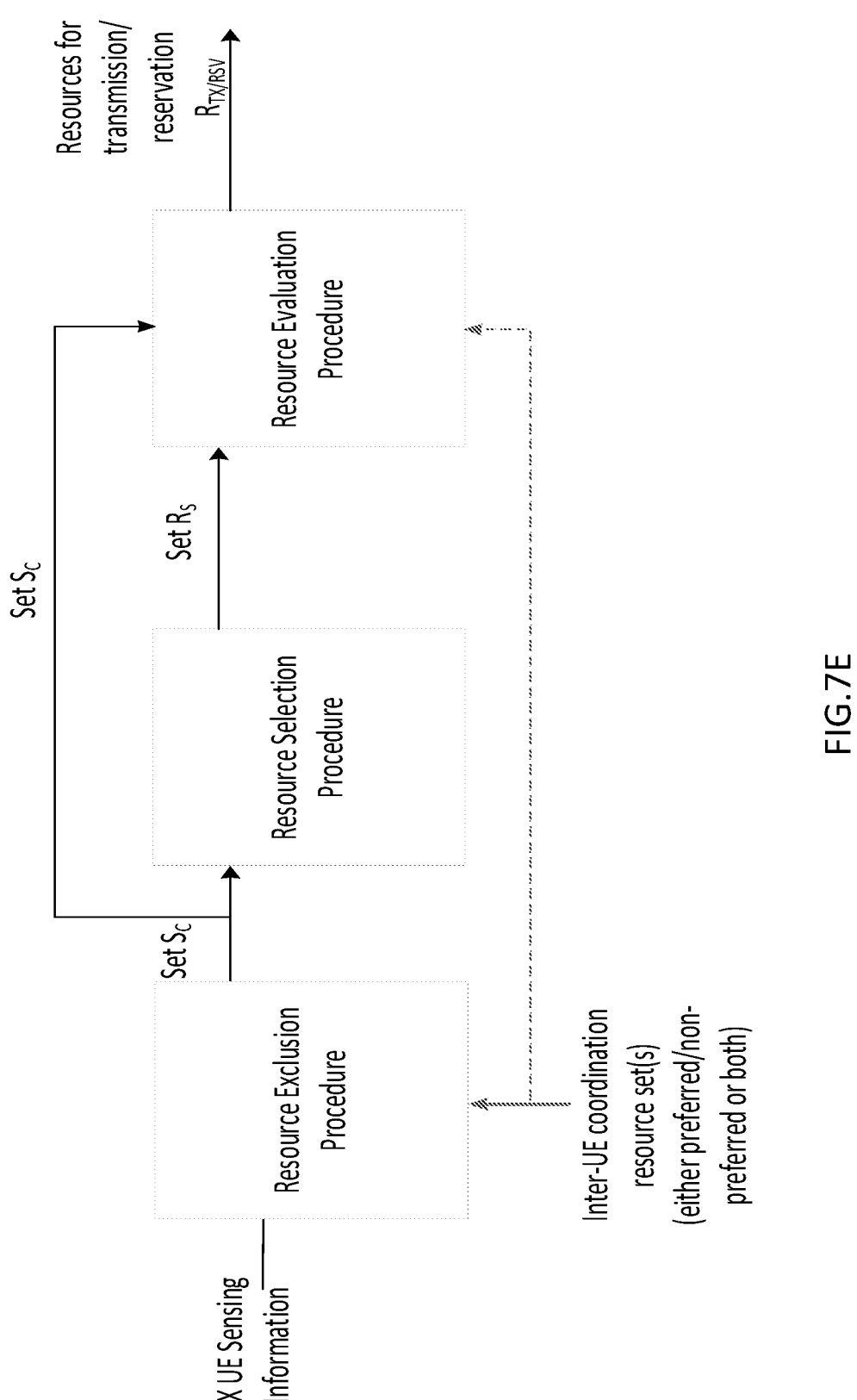
FIG. 7E illustrates a block diagram of a fifth option of a NR V2X sidelink resource allocation procedure with inter-UE coordination feedback in accordance with some embodiments.
Figure 7F:
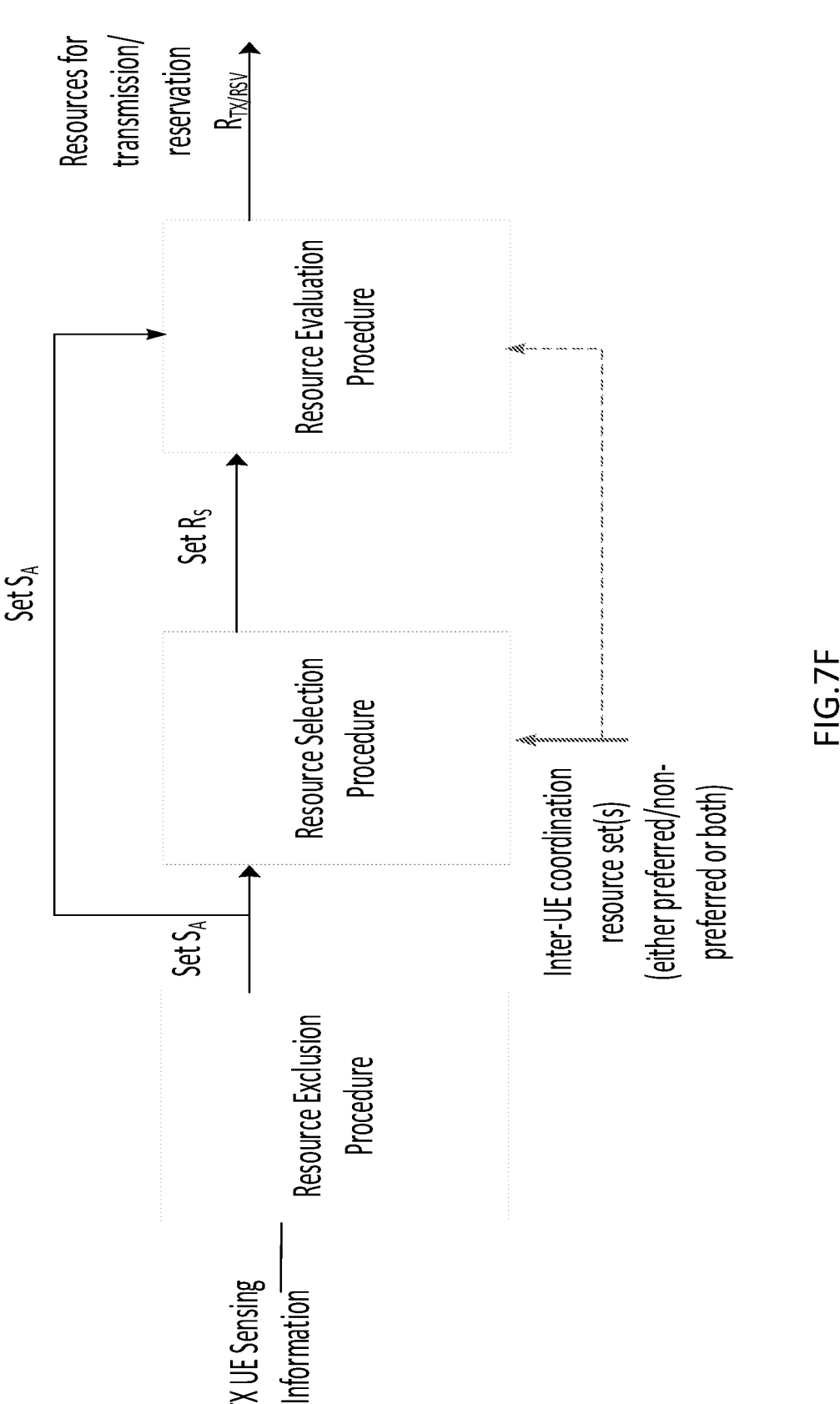
FIG. 7F illustrates a block diagram of a sixth option of a NR V2X sidelink resource allocation procedure with inter-UE coordination feedback in accordance with some embodiments.
Figure 7G:
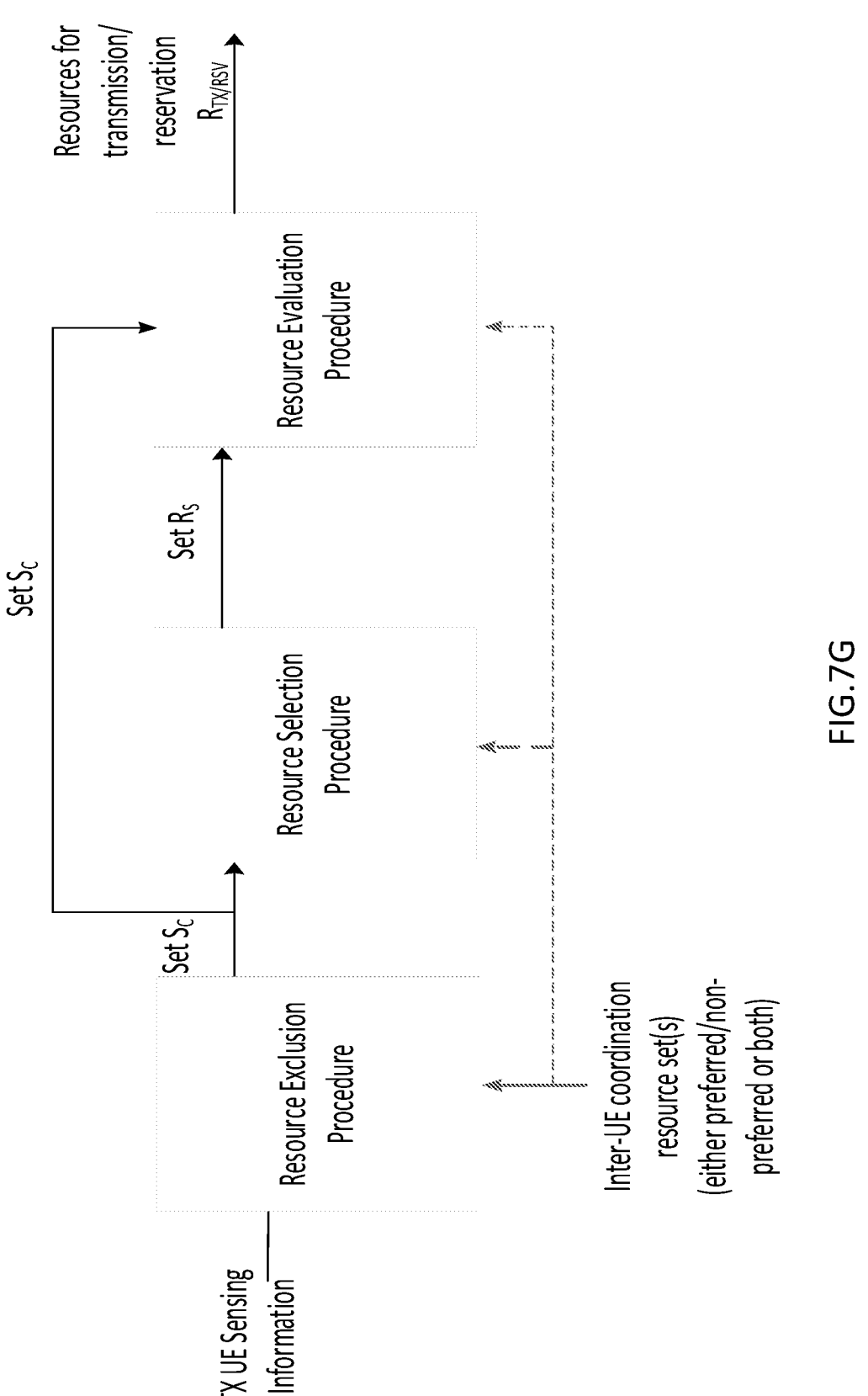
FIG. 7G illustrates a block diagram of a seventh option of a NR V2X sidelink resource allocation procedure with inter-UE coordination feedback in accordance with some embodiments.

FIG. 7A illustrates a block diagram of a first option of a NR V2X sidelink resource allocation procedure with inter-UE coordination feedback in accordance with some embodiments. FIG. 7B illustrates a block diagram of a second option of a NR. V2X sidelink resource allocation procedure with inter-UE coordination feedback in accordance with some embodiments. FIG. 7C illustrates a block diagram of a third option of a NR V2X sidelink resource allocation procedure with inter-UE coordination feedback in accordance with some embodiments. FIG. 7D illustrates a block diagram of a fourth option of a NR V2X sidelink resource allocation procedure with inter-UE coordination feedback in accordance with some embodiments. FIG. 7E illustrates a block diagram of a fifth option of a NR V2X sidelink resource allocation procedure with inter-UE coordination feedback in accordance with some embodiments. FIG. 7F illustrates a block diagram of a sixth option of a NR V2X sidelink resource allocation procedure with inter-UE coordination feedback in accordance with some embodiments. FIG. 7G illustrates a block diagram of a seventh option of a NR V2X sidelink resource allocation procedure with inter-UE coordination feedback in accordance with some embodiments.

One difference between these options is in which procedure the resource sets provided by inter-UE coordination feedback are taken into account for resource selection. In particular, in option 1 (FIG. 7A), the inter-UE coordination feedback information (resource set(s) $S_B$) is used for resource exclusion and formation of candidate resource set $S_C$. In option 2 (FIG. 7B), the inter-UE coordination feedback information (resource set(s) $S_B$) is used for initial resource selection to produce resource set $R_S$. In option 3 (FIG. 7C), the inter-UE coordination feedback information (resource set(s) $S_B$) is used for resource exclusion and formation of candidate resource set $S_B$ and for initial resource selection to produce resource set $R_S$. In option 4 (FIG. 7D), the inter-UE coordination feedback information (resource set(s) $S_B$) is used for resource re-evaluation to produce resource set $R_{TX/RSV}$. In option 5 (FIG. 7E), the inter-UE coordination feedback information (resource set(s) $S_B$) is used for resource exclusion to form candidate resource set $S_C$ and for resource re-evaluation to produce resource set $R_{TX/RSV}$. In option 6 (FIG. 7F), the inter-UE coordination feedback information (resource set(s) $S_B$) is used for initial resource selection to form candidate resource set $R_S$ and for resource re-evaluation to produce resource set $R_{TX/RSV}$. In option 7 (FIG. 7G), the inter-UE coordination feedback information (resource set(s) $S_B$) is used for resource exclusion and formation of candidate resource set $S_C$, for initial resource selection to form candidate resource set $R_S$ and finally for resource re-evaluation to produce resource set $R_{TX/RSV}$.

Inter-UE Coordination Feedback Content

The assisting UE may report the following information in the inter-UE coordination feedback message to assist resource selection at the TX UE:

Identified preferred resource set—Set $S_{B-P}$ (time-frequency or time resources recommended from the RX UE perspective within the resource pool and time interval).

Identified non-preferred resource set—Set $S_{B-NP}$ (time-frequency or time resources not recommended from the RX UE perspective within the resource pool and time interval). The set of non-preferred resources $S_{B-NP}$ may be divided into two resource subsets: Resource set $S_{B1-NP}$, which are resources determined by the assisting UE based on a radio-sensing and resource exclusion/selection procedure and can be constructed following the R16 sensing and resource exclusion procedure; and Resource set $S_{B2-NP}$, which are resources selected or reserved by the assisting UE for potential sidelink or uplink transmissions that affect UE sidelink reception capabilities.

Resource selection metric threshold (e.g., SL-RSRP threshold, distance threshold) values associated with each reported resource set. If fixed thresholds are configured to assisting UE (i.e., not updated by assisting UEs) then this information does not need to be reported. If initial threshold values are configured and further incremented/decremented by assisting UEs for identification of resource sets, then updated thresholds used to generate reported resource sets can be also reported back to the TX UEs.

Resource selection metric (e.g., SL-RSRP measurements, distance) associated with identified resources for each resource set. If the assisting UE is a target receiver UE, the resource selection metric becomes meaningful for resource selection at the TX UE side. SL-RSRP for concurrent transmission measured at the target RX UE has the notion of interference power that may be potentially used to estimate communication link quality, to decide feasibility of transmission at the specific resource and may help to adjust transmission parameters. If the assisting UE is not a target receiver UE, the resource selection metric from this UE may be accomplished with additional information (e.g., distance, SL-RSRP measurement) that characterizes the assisting UE proximity to target receivers. This additional information may be used to characterize the target receiver environment.

Once feedback with preferred and non-preferred resource sets are pre-processed, the feedback may be used in a final resource selection procedure using one of two alternatives. Alternative 1: independent feedback processing for resource exclusion/(re)-selection/(re)-evaluation. In this case, the preferred (and/or non-preferred) resource set signaled in each feedback can be processed independently. Alternative 2:

feedback combining/aggregation for resource exclusion/(re)-selection/(re)-evaluation. In this case, the preferred (and/or non-preferred) resource set can be aggregated over multiple pre-selected feedback reports.

Feedback Resource Set Combining/Aggregation of Resource Set

Scenario 1: Only resources are reported, without an additional associated metric (e.g., SL-RSRP, distance).

In this case the multiple alternatives to generate combined resource set may be used:

Alternative 1: the combined resource set is an intersection of input resource sets:

$$S_{Combined} = S_1 \cap S_2 \cap \ldots \cap S_{K-1} \cap S_K$$

Alternative 2: the combined resource set is a union of input resource sets:

$$S_{Combined} = S_1 \cup S_2 \cup \ldots \cup S_{K-1} \cup S_K$$

Alternative 3: the combined resource set is generated based on resource occurrence. For each resource, the resource occurrence in reports may be estimated and used to decide whether or not a specific resource should be included into (or excluded from) the combined resource set. For example, only resources with an occurrence ratio above a pre-configured threshold-$\geq Thr_B$ may be included into the combined resource set. Here $Thr_B$ is a preconfigured threshold used to determine whether resource is included into (or excluded from) the combined resource set.

Scenario 2: Reported resources are associated with an additional metric (e.g., SL-RSRP, distance).

In this case, the resource may be included into (or excluded from) the combined resource set if the reported additional resource metric is below (e.g., SL-RSRP for preferred resource set) or above (e.g., SL-RSRP for non-preferred resource set) (pre-) configured threshold.

In a further embodiment, the TX UE may estimate and apply the threshold for estimation of resource occurrence ratio for a given metric threshold.

Determination of Preferred/Non-Preferred Resource Type Based on Processing of Multiple Feedbacks Received by TX UE (Combining of Feedback Reports-Resource Sets)

Formation of the set $S_B$ of resources based on inter-UE coordination feedback relies on reported resource classification, i.e., whether the resource can be considered as preferred or non-preferred.

A number of options may be used for determination of non-preferred resources based on processing of multiple feedback transmissions received by TX UE:

For the case when the resource sets are reported without additional metrics (SL-RSRP, distance), the reported resource $R_{x,y}$ is considered as non-preferred if:

Scenario 1: the resource sets from different sources (assisting UEs) are processed individually, and $R_{x,y}$ is a member of non-preferred resources $S_{B-NP-k}$ received from selected assistant $UE_k$, $R_{x,y}$ is a member of at least one set $S_{B-NP-k}$ of non-preferred resource sets $[S_{B-NP-1} \ldots S_{B-NP-K}]$ received from assistant UEs $[UE_1 \ldots UE_k]$, $R_{x,y}$ is a member of all sets of non-preferred resource sets $[S_{B-NP-1} \ldots S_{B-NP-K}]$ received from assistant UEs $[UE_1 \ldots UE_K]$, and $R_{x,y}$ is a member of N of K sets of non-preferred resource sets [$S_{B\text{-}NP\text{-}1}$ . . . $S_{B\text{-}NP\text{-}K}$] received from assistant UEs [$UE_1$ . . . $UE_K$].

Scenario 2: the resource sets from different sources (assisting UEs) are aggregated/combined. $R_{x,y}$ is a member of a combined non-preferred resource set $S_{B\text{-}NP\text{-}Combined}$. For the case when resource sets and corresponding additional metric are reported, the reported resource $R_{x,y}$ is considered as non-preferred if:

Scenario 1: the resource sets from different sources are processed individually. The associated with resource $R_{x,y}$ assistance metric $M_{Rx,y\text{-}k}$>$M_{Thr}$ in a set of non-preferred resources $S_{B\text{-}NP\text{-}k}$ received from selected assistant $UE_k$. The associated with resource $R_{x,y}$ assistance metric $M_{Rx,y\text{-}k}$>$M_{Thr}$ in at least one set $S_{B\text{-}NP\text{-}k}$ of non-preferred resource sets [$S_{B\text{-}NP\text{-}1}$ . . . $S_{B\text{-}NP\text{-}K}$] received from assistant UEs [$UE_1$ . . . $UE_K$]. The associated reported assistance metric $M_{Rx,y\text{-}k}$>$M_{Thr}$ in all sets of non-preferred resource sets [$S_{B\text{-}NP\text{-}1}$ . . . $S_{B\text{-}NP\text{-}K}$] received from assistant UEs [$UE_1$ . . . $UE_K$]. The associated reported assistance metric $M_{Rx,y\text{-}k}$>$M_{Thr}$ in N of K sets of non-preferred resource sets [$S_{B\text{-}NP\text{-}1}$ . . . $S_{B\text{-}NP\text{-}K}$] received from assistant UEs [$UE_1$ . . . $UE_K$].

Scenario 2: Resource sets from different sources are aggregated. The associated reported assistance metric $M_{Rx,y\text{-}Combined}$>$M_{Thr}$ in all sets of non-preferred resources $S_{B\text{-}NP\text{-}k}$, received from the assistant $UE_k$. The above procedures can be also applied for the determination of preferred resources based on processing of multiple inter-UE coordination feedback.

Figure 8A:
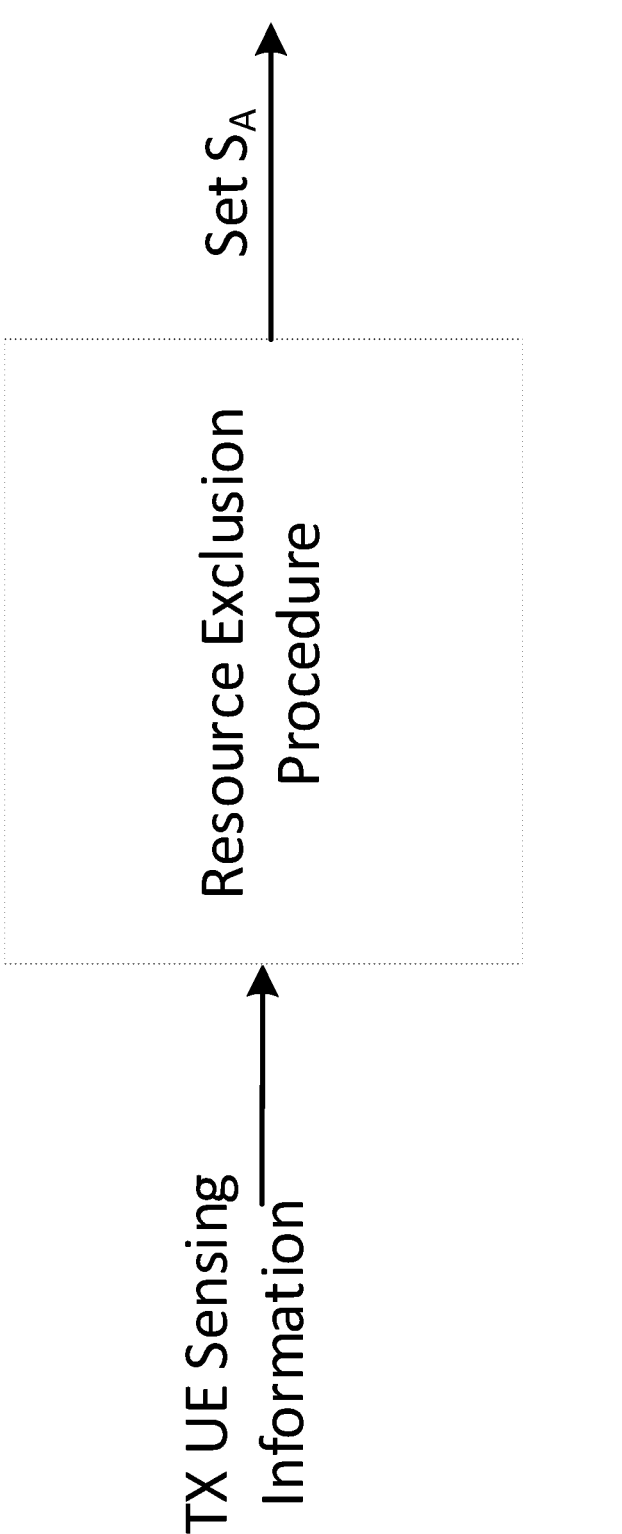
FIG. 8A illustrates a resource exclusion procedure not using inter-UE coordination resource sets in accordance with some embodiments.

Resource Exclusion Based on Non-Preferred Resource Sets and TX Based Sensing to Form Candidate Resource Set for Resource Selection In this section, modifications of the resource exclusion procedure considering inter-UE coordination feedback from assisting UEs are discussed. In legacy operation, the UE uses sensing results by determined via a resource exclusion procedure to generate the candidate resource set $S_A$ that is used for further selection of candidate resources for transmission. FIG. 8A illustrates a resource exclusion procedure not using inter-UE coordination resource sets in accordance with some embodiments.

When feedback is provided, the TX UE can generate two or more sets (up to N) of resources: Set $S_A$: set of resources (set of candidate resources) after resources exclusion applied to TX UE sensing data; Set $S_B$: set(s) of resources from inter-UE coordination feedback; Set $S_{B\text{-}k}$: set of resources for inter-UE coordination feedback from $UE_k$ (for a single UE or aggregated report processing, k=1); Set $S_C$: set of resources (set of candidate resources) after resources exclusion applied to TX UE sensing data and non-preferred resource set(s) (Set $S_{B\text{-}k}$). Set $S_{B\text{-}k}$ may be generated using preferred and/or non-preferred resource sets. In one embodiment, if resource $R_{x,y}$ reported by assistant UE(s) is classified as non-preferred, the resource is added to the set $S_{B\text{-}k}$. Otherwise, if the resource is classified as preferred, the resource should not be added or should be removed from the Set $S_{B\text{-}k}$.

Figure 8B:
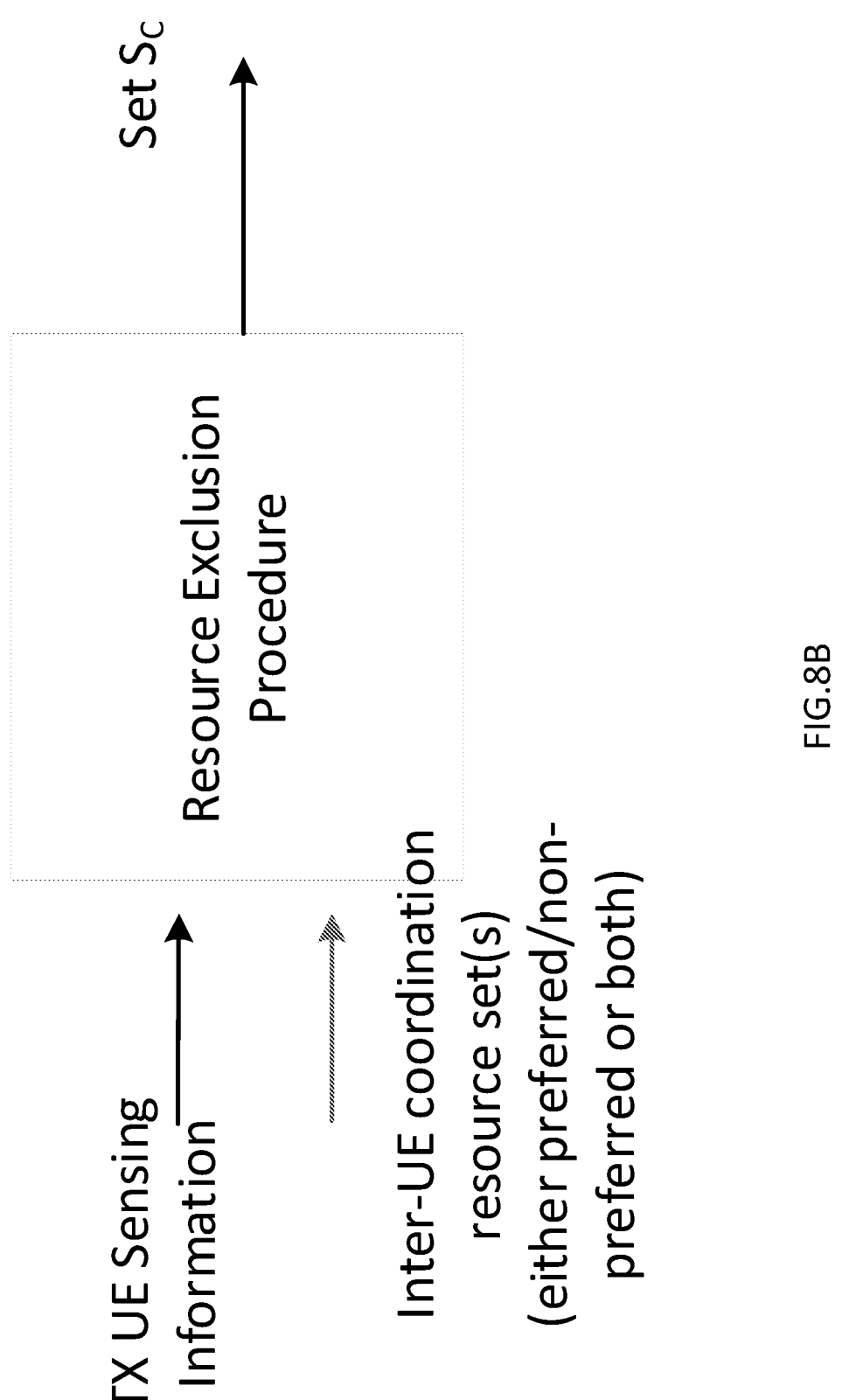
FIG. 8B illustrates a resource exclusion procedure using inter-UE coordination resource sets in accordance with some embodiments.

The following options may be used to enhance the resource exclusion procedure:

Option 1: Non-preferred resources from inter-UE coordination feedback—Set $S_B$ (or Sets $S_{B\text{-}k}$) are excluded from resources candidate resource set $S_A$ irrespective of the results of the resource exclusion procedure that processes the TX sensing results, as shown in FIG. 8B. FIG. 8B illustrates a resource exclusion procedure using inter-UE coordination resource sets in accordance with some embodiments.

Figure 8C:
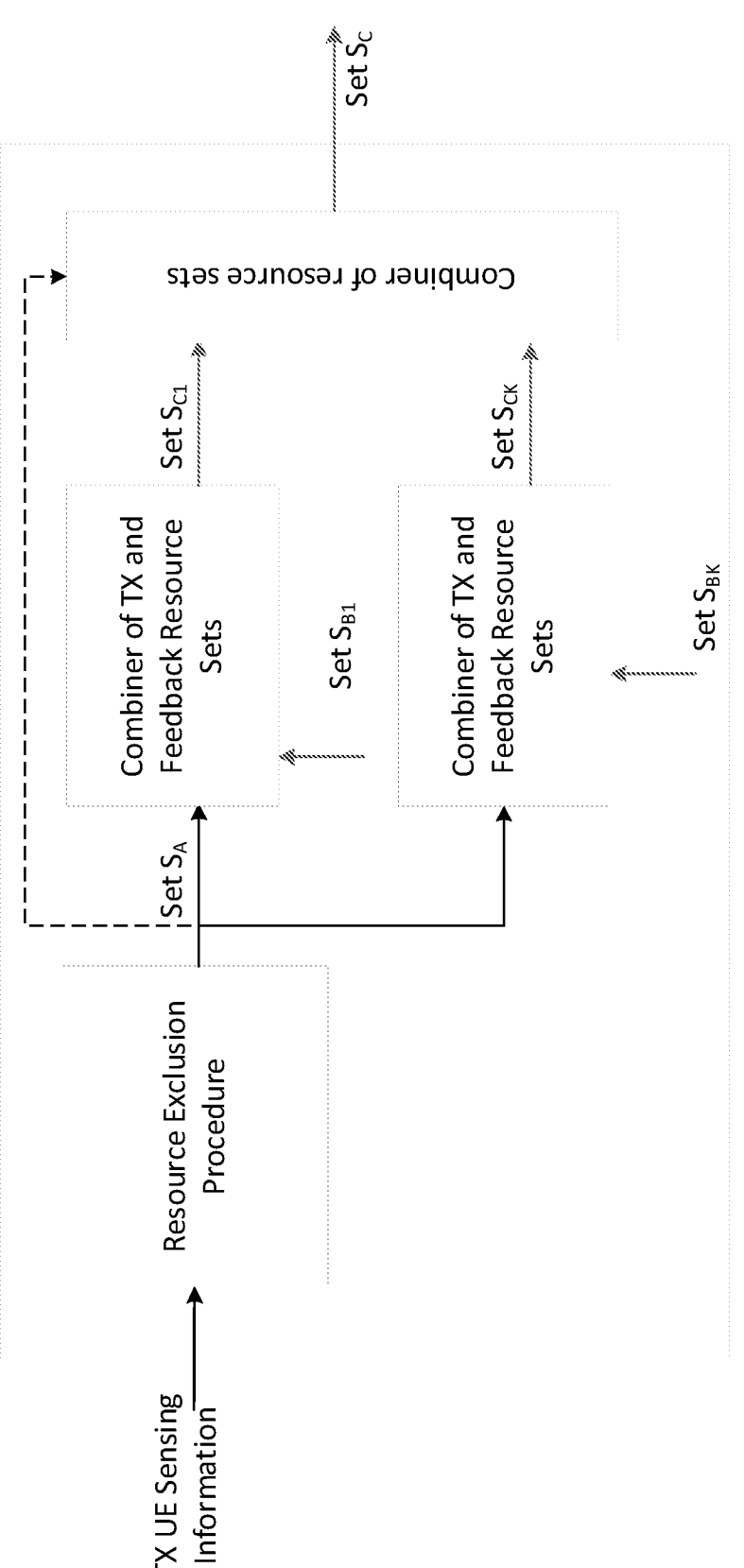
FIG. 8C illustrates another resource exclusion procedure using inter-UE coordination resource sets in accordance with some embodiments.

Option 2: TX sensing results are processed independently to generate candidate resource set $S_A$. FIG. 8C illustrates another resource exclusion procedure using inter-UE coordination resource sets in accordance with some embodiments. The candidate resource set is further combined with non-preferred or preferred resource set $S_{B\text{-}k}$ to obtain UE/feedback-specific candidate resource sets $S_{C\text{-}k}$. Finally, all candidates resource sets $S_{C\text{-}k}$ are combined together (and optionally with TX candidate resource set $S_A$) to generate candidate resource Set $S_C$, as shown in FIG. 8C. The set $S_A$ is added at the last stage to ensure that if the final Set $S_C$ after combining of $S_{C\text{-}k}$ is too small, the set $S_A$ is used as a fallback option or resources can at least be borrowed from this set.

Figure 8D:
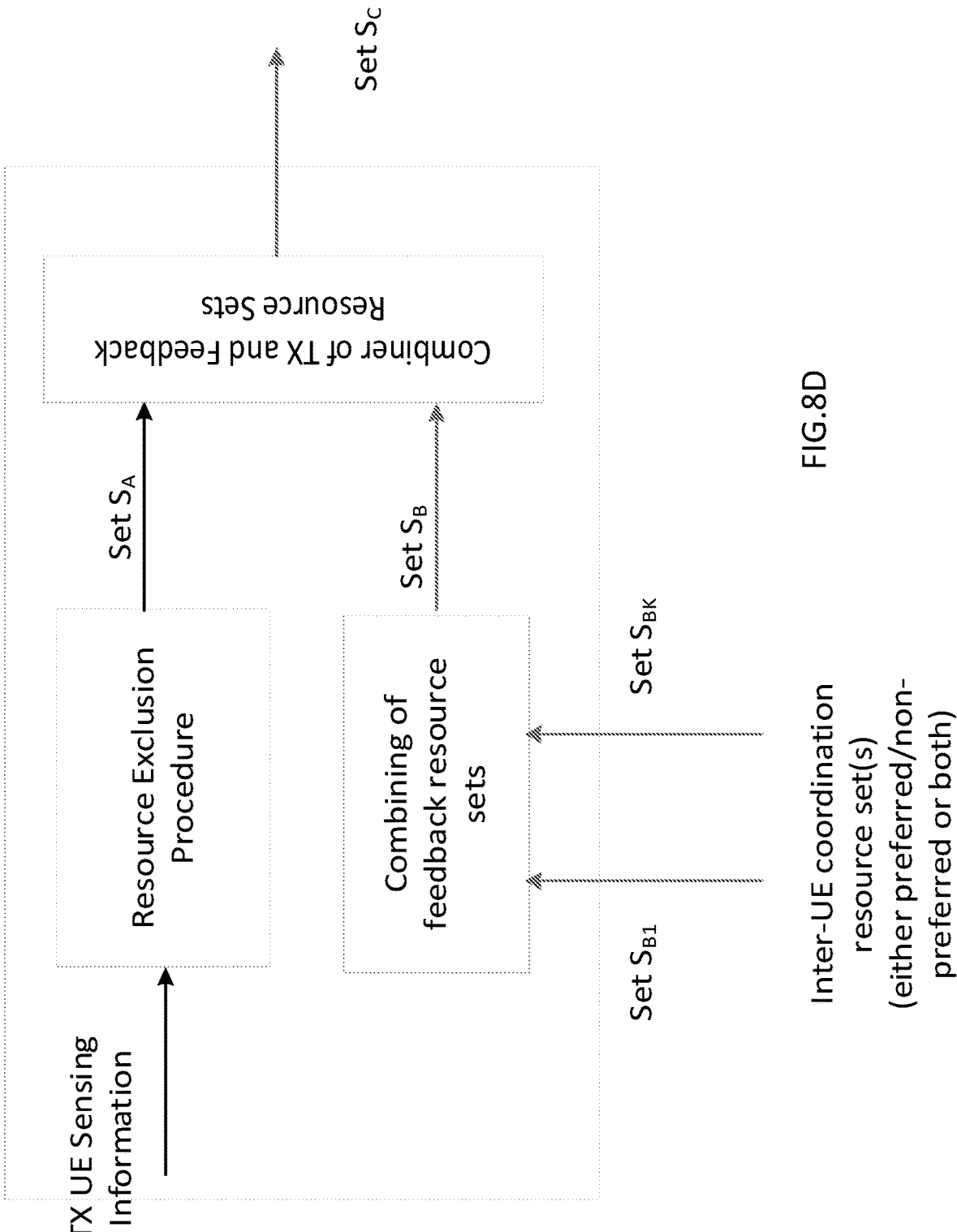
FIG. 8D illustrates another resource exclusion procedure using inter-UE coordination resource sets in accordance with some embodiments.

Option 3: TX sensing results are processed independently to generate candidate resource set $S_A$. FIG. 8D illustrates another resource exclusion procedure using inter-UE coordination resource sets in accordance with some embodiments. The candidate resource set is further combined with non-preferred or preferred resource set $S_B$ to obtain UE/feedback-specific candidate resource sets $S_C$, as shown in FIG. 8D. The Set $S_B$ is generated by combining resource sets from multiple feedback $S_{B\text{-}k}$. If during combining at the last stage the combined Set $S_C$ is too small, the set $S_A$ can be used as a fallback (i.e., Set $S_C$=Set $S_A$) or resources from Set $S_A$ can at least be borrowed to form Resource Set $S_C$.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for operation in a 5G NR network, the apparatus comprising: processing circuitry; and memory,
the UE configured to support inter-UE coordination (IUC) for sidelink (SL) communication with a peer UE,
wherein the processing circuitry is configured to:
encode a sidelink information element for transmission to the peer UE to configure sidelink IUC parameters, wherein when the UE has data to send, the sidelink information element is encoded to indicate that transmission of IUC information is triggered by a condition at the UE; and
encode the IUC information in a sidelink transmission to the peer UE, the IUC information indicating one of preferred and non-preferred resources for a sidelink transmission by the peer UE, and
wherein when transmission of the IUC information was triggered by the condition at the UE, the processing circuitry is configured to encode the sidelink transmission to include the data together with the IUC information.

2. The apparatus of claim 1, wherein when transmission of the IUC information was not triggered by the condition at the UE, the processing circuitry is configured to encode the sidelink transmission to include the IUC information without data.

3. The apparatus of claim 1, wherein when transmission of the IUC information was not triggered by the condition at the UE but was triggered by an explicit request by the peer UE for the IUC information, the processing circuitry is configured to:
encode the sidelink transmission to include the IUC information without the data; and
decode a sidelink transmission from the peer UE with peer data.

4. The apparatus of claim 3, wherein the sidelink transmission from the peer UE with the peer data is received on one of preferred and non-preferred resources.

5. The apparatus of claim 4, wherein prior to encoding the sidelink information element for transmission to a peer UE to configure the sidelink IUC parameters, the processing circuitry is configured to decode a sidelink control information (SCI) format received from the peer UE containing the explicit request for the IUC information,
wherein transmission of the IUC information is triggered by the explicit request by the peer UE.

6. The apparatus of claim 1, wherein the IUC information transmitted to the peer UE is transmitted in one of a sidelink control information (SCI) format 2 and a Medium Access Control (MAC) control element (MAC-CE).

7. The apparatus of claim 6, wherein when transmission of the IUC information was triggered by the condition at the UE, the processing circuitry is configured to further encode the sidelink information element to include a resource reservation interval used for determining the preferred resources.

8. The apparatus of claim 6, wherein the processing circuitry is configured to further encode the sidelink information element to include a Reference Signal Received Power (RSRP) threshold used for use by the peer UE in determining resources of the preferred resources.

9. The apparatus of claim 6, wherein the processing circuitry is configured to encode the SCI format to include a resource selection window for use by the peer UE in selecting resources of one of the one of preferred and non-preferred resources.

10. The apparatus of claim 1, wherein when transmission of the IUC information was triggered by the condition at the UE and the preferred resources are indicated, the processing circuitry is configured to transmit the IUC information indicating a preferred resource set in unicast manner, and
wherein when transmission of the IUC information was triggered by the condition at the UE and the non-preferred resources are indicated, the processing circuitry is configured to transmit the IUC information indicating a non-preferred resource set in a unicast, groupcast or broadcast manner.

11. A non-transitory computer-readable storage medium that stores instructions for execution by one or more processors of a user equipment (UE), the UE configured to support inter-UE coordination (IUC) for sidelink (SL) communication with a peer UE, the one or more processors to configure the UE to, when the instructions are executed:
encode a sidelink information element for transmission to the peer UE to configure sidelink IUC parameters, wherein when the UE has data to send, the sidelink information element is encoded to indicate that transmission of IUC information is triggered by a condition at the UE; and
encode the IUC information in a sidelink transmission to the peer UE, the IUC information indicating one of preferred and non-preferred resources for a sidelink transmission by the peer UE, and
wherein when transmission of the IUC information was triggered by the condition at the UE, the one or more processors is configured to encode the sidelink transmission to include the data together with the IUC information.

12. The non-transitory computer-readable storage medium of claim 11, wherein when transmission of the IUC information was not triggered by the condition at the UE, the one or more processors is configured to encode the sidelink transmission to include the IUC information without data.

13. The non-transitory computer-readable storage medium of claim 11, wherein when transmission of the IUC information was not triggered by the condition at the UE but was triggered by an explicit request by the peer UE for the IUC information, the one or more processors is configured to:

encode the sidelink transmission to include the IUC information without the data; and decode a sidelink transmission from the peer UE with peer data.

14. The non-transitory computer-readable storage medium of claim 13, wherein the sidelink transmission from the peer UE with the peer data is received on one of preferred and non-preferred resources.

15. The non-transitory computer-readable storage medium of claim 14, wherein prior to encoding the sidelink information element for transmission to a peer UE to configure the sidelink IUC parameters, the one or more processors is configured to decode a sidelink control information (SCI) format received from the peer UE containing the explicit request for the IUC information, wherein transmission of the IUC information is triggered by the explicit request by the peer UE.

16. The non-transitory computer-readable storage medium of claim 11, wherein the IUC information transmitted to the peer UE is transmitted in one of a sidelink control information (SCI) format 2 and a Medium Access Control (MAC) control element (MAC-CE).

17. The non-transitory computer-readable storage medium of claim 16, wherein when transmission of the IUC information was triggered by the condition at the UE, the one or more processors is configured to further encode the sidelink information element to include a resource reservation interval used for determining the preferred resources, wherein the one or more processors is configured to further encode the sidelink information element to include a Reference Signal Received Power (RSRP) threshold used for use by the peer UE in determining resources of the preferred resources, and wherein the one or more processors is configured to encode the SCI format to include a resource selection window for use by the peer UE in selecting resources of one of the one of preferred and non-preferred resources.

18. The non-transitory computer-readable storage medium of claim 11, wherein when transmission of the IUC information was triggered by the condition at the UE and the preferred resources are indicated, the one or more processors is configured to transmit the IUC information indicating a preferred resource set in unicast manner, and wherein when transmission of the IUC information was triggered by the condition at the UE and the non-preferred resources are indicated, the one or more processors is configured to transmit the IUC information indicating a non-preferred resource set in a unicast, groupcast or broadcast manner.

19. An apparatus for a user equipment (UE) configured for operation in a 5G NR network, the apparatus comprising: processing circuitry; and memory, the UE configured to support inter-UE coordination (IUC) for sidelink (SL) communication with a peer UE, wherein the processing circuitry is configured to:

decode a sidelink information element received from the peer UE to configure sidelink IUC parameters, wherein when the peer UE has data to send, the sidelink information element indicates that transmission of IUC information is triggered by a condition at the peer UE; and decode the IUC information received in a sidelink transmission from the peer UE, the IUC information indicating one of preferred and non-preferred resources for a sidelink transmission by the UE, and wherein when transmission of the IUC information was triggered by the condition at the peer UE, the processing circuitry is configured to decode the sidelink transmission that includes the data together with the IUC information.

20. The apparatus of claim 19, wherein when transmission of the IUC information was not triggered by the condition at the peer UE, the processing circuitry is configured to decode the sidelink transmission including the IUC information but without the data.

* * * * *